United States Patent Office 3,443,440
Patented May 13, 1969

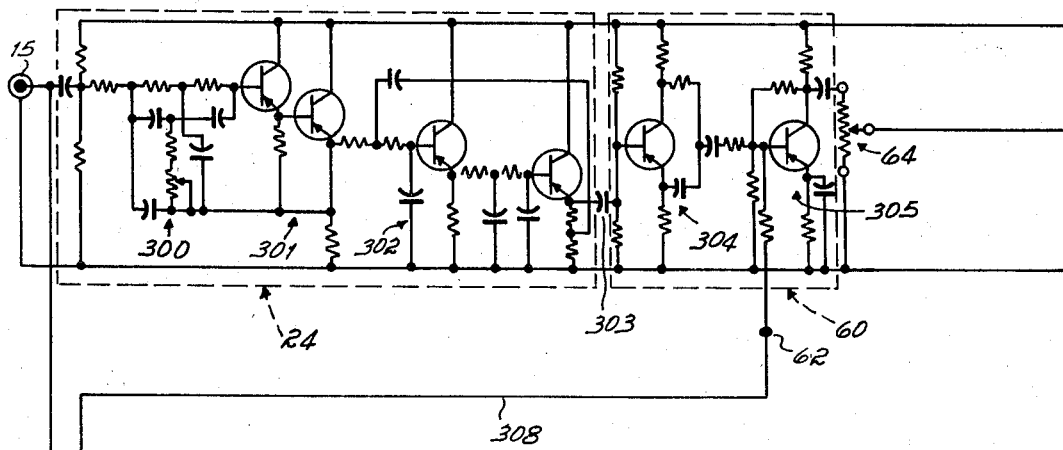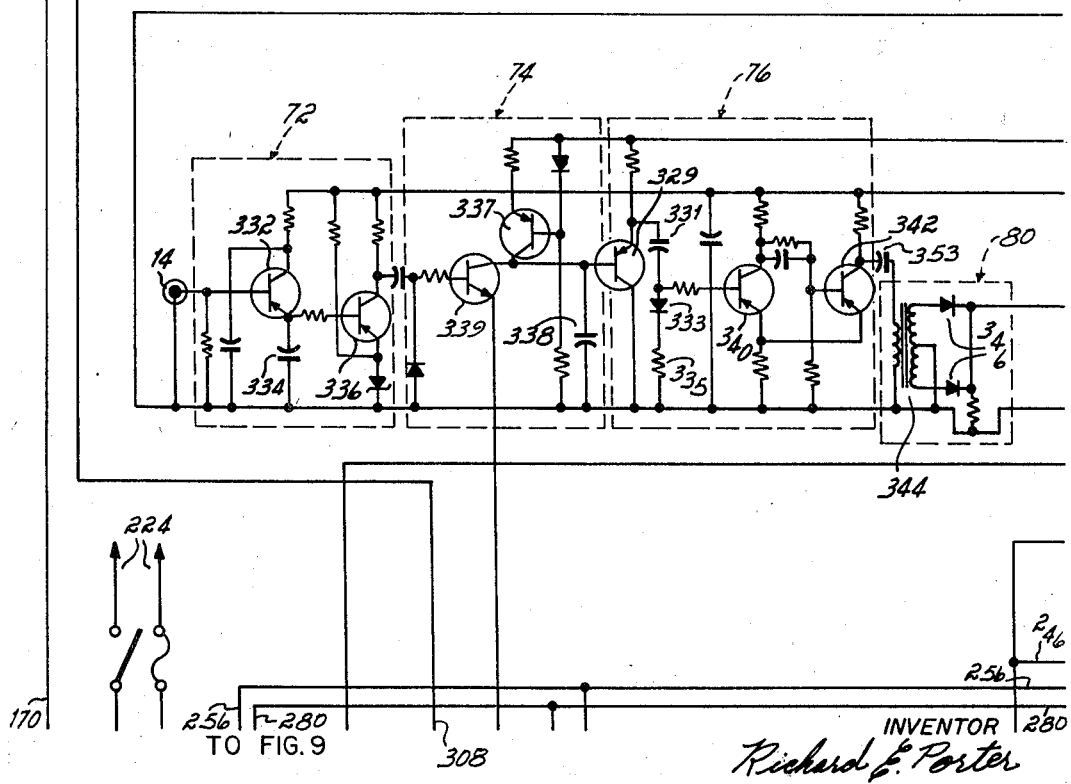
FIG. 5

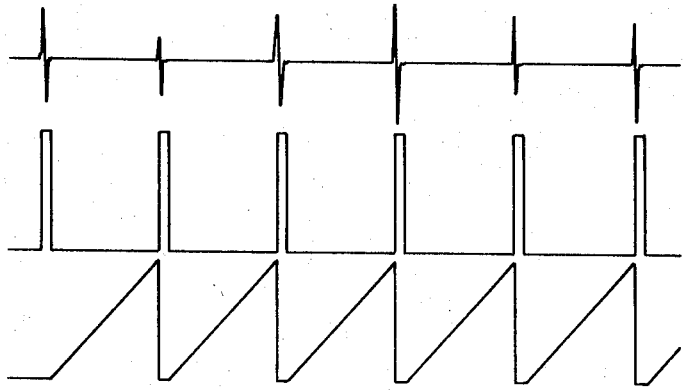
Fig. 13
Fig. 14
Fig. 15
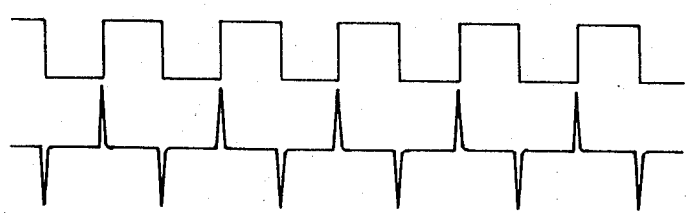
Fig. 16
Fig. 17
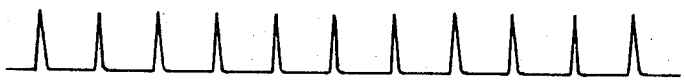
Fig. 18
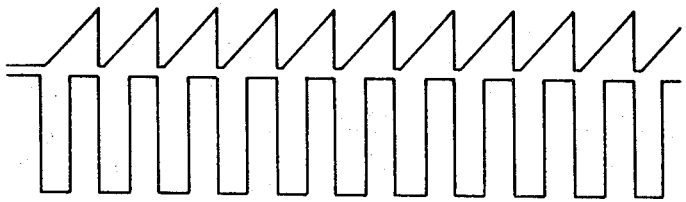
Fig. 19
Fig. 20
Fig. 21
Fig. 22
Fig. 23
Fig. 24

3,443,440
ASSEMBLY BALANCER
Richard E. Porter, Columbus, Ohio, assignor to Abex Corporation, New York, N.Y., a corporation of Delaware
Filed Apr. 21, 1965, Ser. No. 449,847
Int. Cl. G01m 1/16
U.S. Cl. 73—462　　　　　　　　　　　　　7 Claims

ABSTRACT OF THE DISCLOSURE

Apparatus for determining the unbalance of a rotating assembly, e.g. the crankshaft of an internal combustion engine. The apparatus includes two vibration transducers attached to the assembly in two correction planes and a speed signal generator, e.g. a spark plug pickup. The transducer signals are gated by pairs of synchronous detectors controlled by the speed signal so that the synchronous detector outputs correspond only to the frequency crankshaft rotation. A circuit connected to the detectors produces a rotor unbalance signal having an amplitude corresponding to the amount of rotor unbalance and a phase corresponding to the position of rotor unbalance. "Amount" and "position" meters indicate these amounts automatically.

---

This invention relates generally to an improved unbalance analyzing apparatus and a method of analyzing vibrations to determine unbalance. More particularly, the invention is directed to such an apparatus and method which are utilized to determine the balance or unbalance of an assembly including a rotating member and which are insensitive to variations in speed of the device being analyzed.

The overall object of the present invention is to provide means for readily analyzing the dynamic unbalance of a device, such as an engine, motor, turbine, pump or the like, having a rotating member and to provide means for indicating the amount of a corrective weight and the position of attachment of such a weight on the rotating member to effect a correction of the observed unbalance. In order to facilitate a fuller understanding of the present invention, it will be discussed in relation to a device for analyzing unbalance in an internal combustion engine.

In the past, highly skilled operators were required to operate engine analyzers which determine the amount and position of the crankshaft unbalance in an internal combustion engine. A common limitation of prior art engine analyzers is that the operator must maintain the engine speed constant at a predetermined speed. Consequently, the accuracy of the results obtained from the analyzer depends upon the skill of the operator in maintaining the speed of the engine constant. However, as a practical matter, it is very difficult to maintain the engine speed constant. Furthermore, in the prior art analyzers, a stroboscopic lamp is used to determine the locus of unbalance of the rotating rotor which carries a reference mark. The lamp is energized by the output of a vibration transducer or pickup mounted on the engine near one end thereof. The light is directed on the rotating rotor to cause the reference mark to appear stationary. A meter indicates the amount of rotor unbalance in ounces. The operator remembers the apparently stationary position of the reference mark, shuts down the engine and manually relocates the reference mark until it coincides with the position as observed under the stroboscopic lamp. The indicated weight is then added to the rotor at a point determined by the lag angle for the particular type of engine under test. The lag angle will have been previously determined by running a master engine at the predetermined speed and noting the locus of unbalance. The lag angle is constant for all engines of the same type running at the same speed.

When using these known analyzers, the operator must be sure to note the position of the reference mark under the stroboscopic lamp at the exact time that the speed of the engine is at the predetermined speed. Consequently, the accuracy and speed of the balancing of an engine with a prior art analyzer is extremely dependent upon the skill of the particular operator in maintaining the engine speed constant at the predetermined speed, noting the position of the reference mark exactly at the predetermined speed, and properly remembering the position of the reference mark when the rotor is subsequently manually relocated so that weight may be added to, or removed from, the correct point on the rotor.

In contrast, one of the principal objects of this invention is to provide a method of analyzing unbalance and unbalance analyzing apparatus which provide exceedingly accurate results unaffected by variations in speed of the engine or other device under test.

Another object of this invention is to provide such an apparatus which is fully automatic and can be operated by a relatively unskilled operator.

A further object of this invention is to provide an unbalance analyzing apparatus which automatically and simultaneously determines the amount and position of unbalance in a plurality of correction planes; for example, in both the front and rear correction planes of a running engine.

Another object is to provide unbalance analyzing apparatus wherein vibration signals derived from a pickup on, or near, the rotor bearing are passed through a highly selective pass filter means which is controlled by a rotor speed signal to pass only unbalance signals having a frequency corresponding to the rotor speed.

More particularly, it will be appreciated that the signals sensed by the vibration pickup are exceedingly complex. These signals include not only the vibration components introduced by the rotating member (the unbalance which it is desired to correct), but also vibration components introduced by other elements of the assembly; for example, water pumps, fuel pumps, and the like, in an automobile engine.

The present invention is predicated in part upon the concept of providing means for separating from this complex input signal only the component of the signal due to the rotor unbalance, i.e. the component of the signal having a frequency equal to the rotor speed. In accordance with the present invention, this is accomplished in essence by applying the vibration signals to two synchronous detectors which are gated 90° out of phase with each other at a frequency corresponding to the rotor speed.

The present invention is further predicated upon the concept of providing means for combining the output signals from synchronous detectors to form a single signal having an amplitude corresponding to the amount of unbalance and a phase corresponding to the angular position of the unbalance on the rotor. In accordance with the present invention, this object is accomplished by modulating or chopping the synchronous detector output signals with the reference frequency and applying the signals to angularly oriented windings of an induction resolver. The induction resolver in combination with an R-C circuit vectorially combines the modulated component signals to produce a signal with an amplitude proportional to the amount of rotor unbalance and a phase proportional to the position, or locus, of the unbalance.

Still anther object of the present invention is to provide a rotor unbalance analyzing apparatus wherein the speed signal for controlling the synchronous detectors is derived directly from the rotating assembly; for example, from a spark plug of an internal combustion engine.

A more specific object of the present invention is to provide electronic circuits for converting the narrow irregular signals derived from the spark plug to uniform square waves effective for driving the synchronous detectors.

Still another object of this invention is to provide means for compensating the unbalance signal derived from the vibration pickup in each correction plane for cross effects introduced by vibrations in the other correction plane.

Another object of this invention is to provide such an apparatus which will be automatically disabled if the apparatus under test is not operating within a predetermined speed range.

Still another object of this invention is to provide such an apparatus which will be automatically disabled if an internal combustion engine under test is misfiring or otherwise running roughly so that erroneous results are not obtained from the apparatus.

Briefly, the foregoing objects are attained in an embodiment for testing engines by attaching two vibration pickups adjacent to the front and rear correction planes of the engine. A third pickup, called a reference pickup, is applied to a spark plug lead. The complex vibration signal from each of the front and rear vibration pickups is fed to two synchronous detectors which are gated by a switching signal derived from a reference channel. The reference channel converts the voltage or current pulses derived from the spark plug to a sine wave at crankshaft frequency. The reference channel signal is then divided: one portion of the signal drives one of the synchronous detectors in the front channel and one of the synchronous detectors in the rear channel. The other portion of the signal is shifted 90° in phase and drives the other synchronous detector in each channel. This dual synchronous detection provides two DC voltage signals for each plane which are proportional to the amplitude of the 90° components of the unbalance vibration signal, and which are independent of engine speed. These voltages are indicative of both the phase or position and the amount of the unbalance in both the front and the rear planes. The voltage signals are electronically chopped at 1000 c.p.s. and vectorially added through resolvers so that the unbalance signal for each plane appears as a 1000 c.p.s. sine wave whose amplitude is the amount of unbalance and whose phase is the position of unbalance. Even though the engine speed may vary during the balancing operation, the frequency of the unbalance signal will always be 1000 c.p.s. Thus, the cross effect correction networks are greatly simplified since they can be designed to work at a constant frequency.

The necessary cross effect correction signals are summed with the unbalance signals for each channel and the resultant voltage is indicated on the "amount" and "position" meters for both front and rear correction planes at the same time.

A portion of the reference channel signal is also fed to an engine tachometer to indicate the engine speed in revolutions per minute and to a control circuit which disables the front and rear channels when the speed is not within a desired range.

The complex vibration signals from both the front and rear pickups are also fed through filters which pass only signals below the first harmonic of the engine speed. These components are added and fed to circuitry which disables the front and rear channels and gives a rough engine indication when the sum exceeds a preset level.

These and other objects and advantages of the present invention will be more readily apparent from a consideration of the following detailed description of the drawings illustrating one preferred embodiment of the invention.

In the drawings:

FIGURE 5 is a schematic circuit diagram of a portion of the present analyzer circuit including the input connections from the front pickup and spark plug pickup.

FIGURE 13 is a diagrammatic view showing the wave form of the voltage signal output of the spark plug pickup.

FIGURE 14 is a diagrammatic view showing the wave form of the output signal from the pulse stretcher and amplifier.

FIGURE 15 is a diagrammatic view showing the wave form of the output signal from the first ramp generator in the reference channel.

FIGURE 16 is a diagrammatic view showing the wave form of the output signal from the first emitter follower and Schmitt trigger circuit in the reference channel.

FIGURE 17 is a diagrammatic view showing the wave form of an internal signal in the differentiator pulse generator circuit after the square wave output of the Schmitt trigger has been differentiated.

FIGURE 18 is a diagrammatic view showing the wave form of the output signal from the differentiator and pulse output circuit showing the manner in which alternate pulses are inverted to form a train of positive pulses.

FIGURE 19 is a diagrammatic view showing the wave form of the output signal from the second ramp signal in the reference channel.

FIGURE 20 is a diagrammatic view showing the output signal from the second emitter follower and Schmitt trigger in the reference channel.

FIGURE 21 is a diagrammatic view showing the wave form from the output of the low pass filter circuit.

FIGURE 22 is a diagrammatic view showing the wave form of the output signal from the 90° phase shifter network.

FIGURE 23 is a diagrammatic view of the wave form of the output from the Schmitt trigger circuit fed from the 90° phase shifter.

FIGURE 24 is a diagrammatic view showing the wave form of the output signal from the Schmitt trigger connected directly to the low pass filter.

Figure 1:
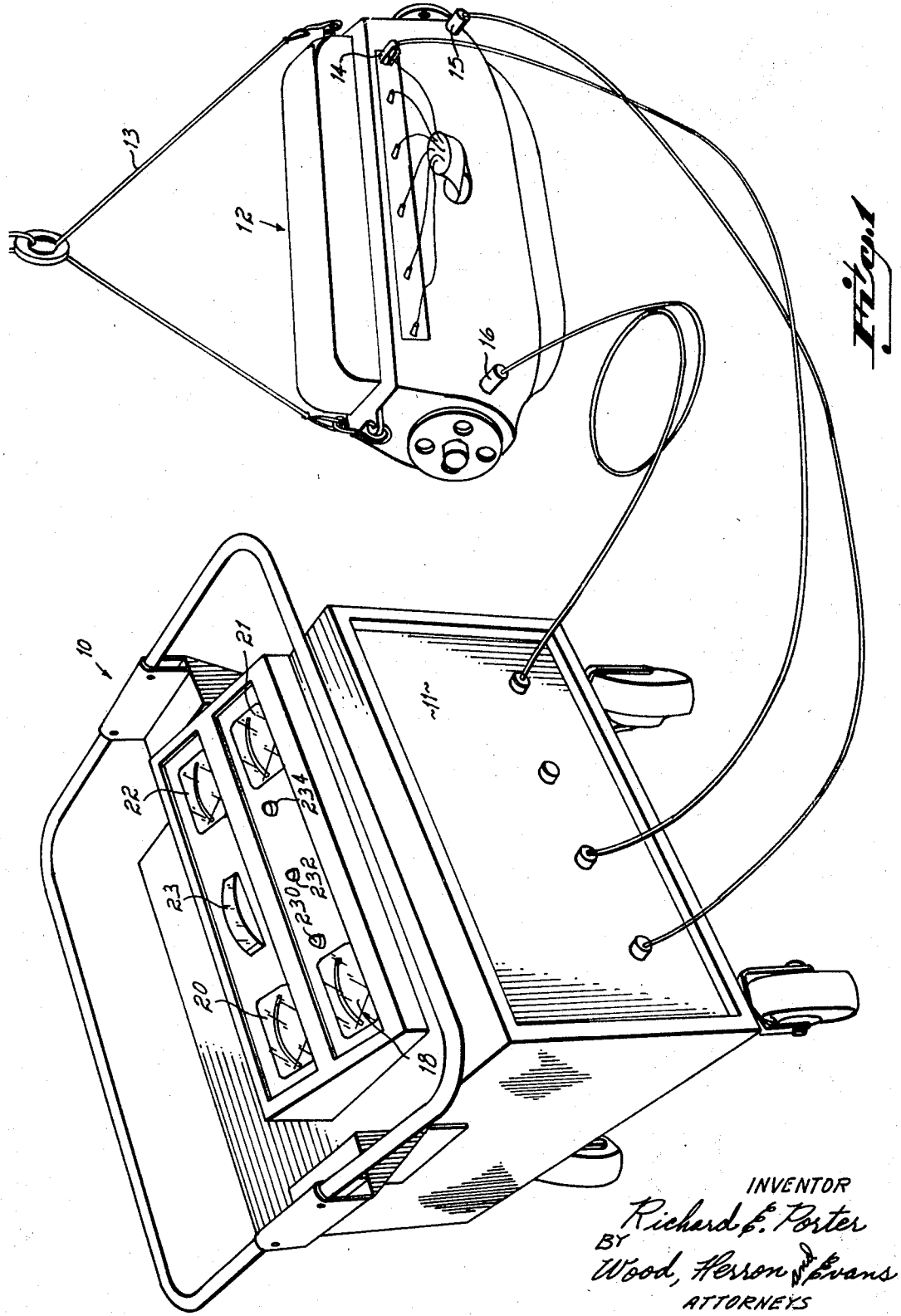
FIGURE 1 is a semidiagrammatic perspective view showing an engine being balanced utilizing one preferred embodiment of the present analyzer.
Figure 2:
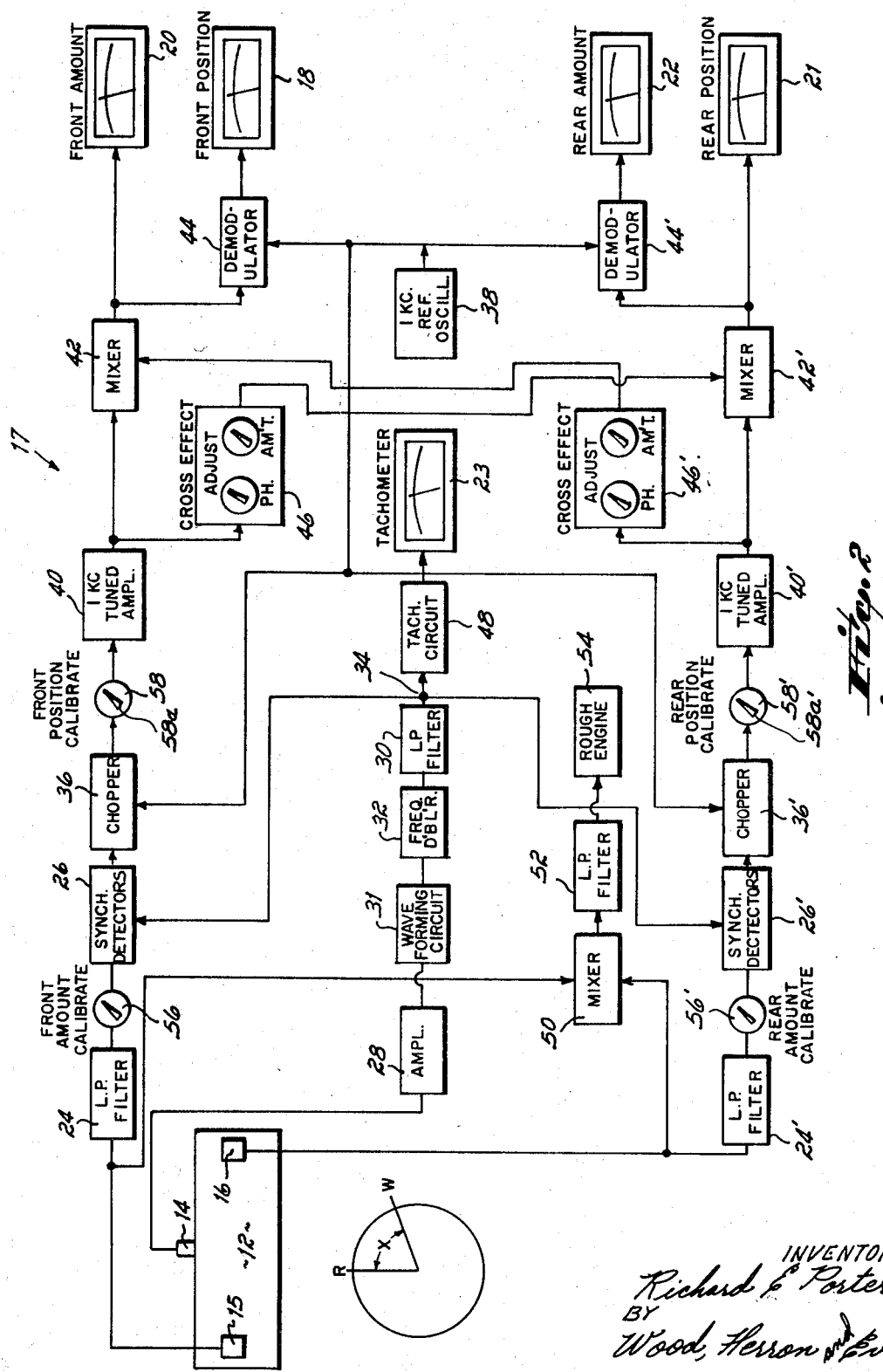
FIGURE 2 is a functional block diagram showing the input connections to the present analyzer circuit and the readout meters.

As shown in FIGURES 1 and 2, one preferred form of analyzer 10 includes a portable cabinet 11 which can be set up in an area in which devices are to be tested. As was indicated previously, the analyzer 10 can be utilized to test various forms of devices, including a rotating member, for example, engines, turbines, motors, pumps and the like. It is felt that the principles of operation and the method of use of an analyzer of the present invention can, perhaps, best be illustrated by a detailed description of an engine analyzer, such as might be utilized to test engines coming off the assembly line of an automobile plant.

Conventionally, engines, such as engine 12, are carried along an assembly line by means of a conventional support hanger. These engines are tested at an analyzer station which is adjacent to the engine assembly line. During the test operation the engines are still mounted on the conventional support hanger. Since the engine support hanger constitutes no part of the present invention, engine 12 is shown diagrammatically in FIGURE 1 as being supported by a cable 13. At the analyzer station, these engines are operating under their own power.

Three input connections are made from the engine to the analyzer. One of these connections is a spark plug pickup 14 which is essentially an inductive pickup including a coil placed around a conductor connected to a selected spark plug, for example a No. 1 plug. This inductive pickup provides a series of pulses whose repetition rate is proportional to engine speed, and more specifically, is equal to one-half crankshaft speed. It is to be understood that for analyzing engine unbalance, and particularly for analyzing the unbalance of other types of devices having rotating members, other forms of shaft speed pickups can be employed. For example, a photoelectric type of pickup sensing a mark which rotates with the shaft speed can be used. Similarly, a proximity type of pickup or a contact switch type of pickup can be substituted for the spark plug pickup 14 if desired. In each case, a pulse or electrical signal is periodically produced, which signal is correlated with the speed of the rotating member.

In addition to the spark plug pickup 14, the analyzer includes a front vibration pickup 15 and a rear vibration pickup 16 which are attached to the engine housing adjacent to the front end of the crank shaft and the rear end of the crankshaft, i.e. adjacent to the front and rear correction planes. Each pickup, or vibration transducer, consists essentially of a dual coil electromagnetic, velocity dependent assembly mounted in an aluminum housing which is filled with a constant viscosity dampening liquid. Any suitable form of velocity-type pickup can be employed. One typical pickup is shown in T. Ongaro United States Patent No. 2,754,435. Another and preferred form of pickup is shown in Arthur Crawford pending patent application Ser. No. 312,021 for "Vibration Pickup."

The front and rear velocity pickups and the spark plug pickup provide input signals to an analyzer circuit indicated generally at 17 in FIGURE 2. This circuit in turn actuates five meters. Two of these meters are the front "position" meter 18 and front "amount" meter 20. Front position meter 18 indicates to the operator the angular displacement of the weight unbalance from a predetermined reference point on the flywheel. That is, this meter indicates the number of degrees X (FIGURE 2) from the reference point R to the point at which a weight W is to be added to, or removed from, the front end of the engine, for example from the front pulley or the like, in order to balance the engine. The reference point R is a mark on the flywheel which is either adjacent, or at a predetermined angular relationship, to the front pickup 15 when the No. 1 spark plug fires. The front amount meter 20 indicates the weight W in ounces, or any other convenient unit of weight measure, to be added or removed to balance the front plane of the engine.

In a similar manner, the analyzer circuit operates a rear "position" meter 21 and a rear "amount" meter 22. These meters respectively indicate the position and amount of weight to be added to, or subtracted from, the rear end, flywheel or the like. A fifth meter operated by the analyzer circuit is a tachometer 23 which indicates the speed at which the engine is running.

Let us now look at FIGURE 2 in more detail to obtain a broad understanding of the manner in which the engine unbalance analyzer operates. As there shown, the alternating current vibration signal derived from the front pickup 15 is fed through a low past filter 24 in the front channel to eliminate third and higher order harmonics of the "unbalance vibration" signal. The "unbalance vibration" signal is the vibration signal caused by crankshaft unbalance as opposed to extraneous vibrations caused, for example, by a water pump. This signal has a frequency corresponding to the speed at which the engine 12 is running. The output of the low pass filter 24 is fed to a pair of synchronous detectors indicated at 26. Each of the synchronous detectors functions as an extremely sharp cutoff, variable frequency filter which passes only signals at the unbalance frequency corresponding to the speed of the engine.

The pair of synchronous detectors 26 are driven in response to a phase reference or speed signal having a frequency corresponding to the exact speed at which the engine is running during the analysis. The phase reference signal can be derived in any suitable manner from the engine. In the preferred embodiment, the signal is derived from the No. 1 spark plug of engine 12 by means of the inductive plug pickup 14 which provides a pulse to amplifier 28 each time the plug fires. In a typical four-cycle engine, one pulse will be derived from the spark plug for every two revolutions of the engine. These pulses are amplified in the amplifier 28 and are fed to a wave forming circuit 31 which transforms the narrow irregular input pulses to uniform symmetrical square waves. These square waves are then doubled in frequency by a frequency doubler 32 and are fed through a low pass filter 30 which functions to transform the square waves to a sine wave and to provide the same phase shift with engine speed in the reference signal as occurs in the front and rear correction channels.

The speed reference signal is divided by suitable circuits, the details of which are explained below, into two signals 90° out of phase with one another. These signals drive, or gate, the two synchronous detectors 26. Each of the synchronous detectors 26 is thus switched by these pulses at a frequency corresponding to the actual running speed of the engine, and consequently the output of each synchronous detector is a DC signal correlated with the amplitude of one of the 90° vector components of the unbalance vibration of engine 12 and free of extraneous vibration effects, such as those due to pumps, valves, cam shaft, plug firing, etc.

The DC output of the pair of synchronous detectors 26 is chopped in a chopper 36 driven by a 1 kc. reference oscillator 38. The chopped signals are vectorially combined in induction resolver 58 to form a single signal which is applied to a 1 kc. tuned amplifier 40, the output of which is a sine wave with an amplitude proportional to the amount, or weight, of unbalance W and with a phase relative to the output of the 1 kc. reference oscillator proportional to the angle X or the position on the flywheel at which the weight W must be added to balance the engine.

The sine wave signal from amplifier 40 is then compensated in amplitude and phase to eliminate from the front unbalance signal, errors which are attributable to an unbalance vibration occurring in the rear correction plane. This compensation is accomplished in a mixer 42 to which the output of amplifier 40 is applied together with a portion of the unbalance signal from the rear channel. The corrected signal at the output of mixer 42 is then applied to the voltmeter 20 which indicates in ounces, or other units of weight, the amount of the unbalance weight W. The output of the mixer is also fed to a phase-sensitive demodulator 44 where the output of mixer 42 is compared in phase with the output of the 1 kc. reference oscillator 38. The output of demodulator 44 corresponds to the difference in phase between the reference oscillator output and the mixer 42 output and is fed to the position meter 18 which is calibrated in degrees to indicate the angle X from the reference point R to the point where the weight W must be added to balance the engine.

The rear velocity pickup 16 provides vibration signals to the "rear" channel which is identical to the "front" channel just described. The output of transducer 16 is applied through a low pass filter 24' to a pair of synchronous detectors 26' which are driven at a 90° phase angle relative to one another by the engine phase reference or speed signal which is taken from point 34 and split as explained above. The output signals of the synchronous detectors 26' are chopped by chopper 36' and applied to an induction resolver 58', and 1 kc. tuned amplifier 40'. The sine wave signal output of the tuned amplifier has an amplitude which corresponds to the amount of rear plane unbalance, and the phase of this signal relative to the output of the 1 kc. reference oscillator 38 is proportional to the angle X. This signal is also applied to a mixer 42' where it is corrected for cross effects induced from the vibration occurring in the front correction plane. The corrected output of the mixer is then fed to the voltmeter 21 which indicates the amount of weight W and to the phase-sensitive demodulator 44' whose output is read by the position meter 22 to indicate the angle X.

The output of the tuned amplifier 40' in the rear channel is also applied through an adjustable cross effect circuit 46' to the mixer 42 in the front channel effectively to subtract from the output of the tuned amplifier 40 the components of the sine wave signal which are attributable to vibrations occurring in the rear plane. In like manner, the output of the tuned amplifier 40 in the front channel is applied through an adjustable cross effect circuit 46 to mixer 42' effectively to subtract from the output of the tuned amplifier 40' the unbalance signal components attributable to unbalance vibrations occurring in the front correction plane.

The phase reference or speed signal derived from the plug transducer 14 and appearing at point 34 is also applied to a tachometer circuit 48 whose output is applied to the tachometer 23 to provide a visual readout of the actual engine speed. It will be explained below the manner in which tachometer circuits 48 are effective to disable the engine analyzer circuit 17 unless the engine is running in a desired speed range, e.g. 1200–1800 r.p.m.

The outputs of the front vibration pickup 15 and the rear vibration pickup 16 are also fed to a mixer 50 whose output is a resultant signal proportional to the total vibration sensed by the pickups 15 and 16. The output of the mixer 50 is fed to a low pass filter 52 which passes only signals having frequencies corresponding to one-half the speed of the engine and below. Consequently, the output of low pass filter 52 is generally indicative of the roughness of the engine caused by misfiring, etc. Since the extraneoues vibrations caused by an extremely rough engine may introduce undesirable errors in the analyzer circuits, a rough engine indicator 54 provides a visual readout to the operator to indicate that the engine is running too roughly to perform the analysis. When such a condition exists, the front and rear channels of the analyzer 17 are disabled and the amount and position meters are locked.

Suitable amount calibrate means 56 and 56' and unbalance position calibrate means 58a and 58a' are provided to calibrate the position and amount meters before an engine is tested. Calibration may be accomplished by adjusting the calibration means to indicate correct readings when a perfectly balanced engine is purposely unbalanced by placing a known weight at a known position or angle X from point R.

Let us now look at FIGURES 3 and 4 which show in a schematic block diagram form the components of the analyzer which has already been functionally described in connection with FIGURE 2. As there shown, the AC vibration signal derived from the front velocity pickup 15 is applied to the M-derived low pass filter 24 which has an upper cutoff frequency of about 40 cycles per second. Because of the non-linearities introduced by the engine supports employed in a typical assembly plant, it is preferred that the engine under test be operating at a speed in the range of 1200 to 1800 r.p.m., i.e. 20 to 30 cycles per second. It will be understood, however, that other speed ranges can be employed depending upon various factors, such as the device being tested, and the manner in which the device is supported during the test.

Let us assume that the engine is running in the middle of the range at 1500 r.p.m. or 25 cycles per second. It is important that the low pass filter 24 have a sharp cutoff at its upper frequency so that at least the third harmonic of the unbalance signal, i.e. 75 cycles per second, is blocked by the filter 24. The third harmonic must be blocked since the following synchronous detectors, while effectively blocking even harmonics, are not effective to completely cancel odd harmonics.

The output of filter 24 is fed to a phase shifter and mixer amplifier circuit 60. One function of the mixer-amplifier portion of circuit 60 is to facilitate the introduction of input signals from the calibrator during the calibration procedure. The second function of the circuit 60 is that of a phase shifter. More particularly, circuit 60 shifts the phase of the vibration signal picked up by unit 15 so that the phase of this signal is shifted the same amount as the phase shift introduced in the 90° phase shifter circuit 90. Thus, there is no relative shift between the signals in the reference channel and the signals in the front correction channel introduced by variation in engine speed as seen by the phase meter.

In addition, a manually controllable voltage from a calibrator (not shown) may be applied to the terminal 62 of circuit 60 during calibration of the analyzer. The calibrator and calibrating procedure form no part of the present invention. The output of circuit 60 is applied to a manually adjustable front amount calibrate potentiometer 64 which adjusts the output of circuit 60 to provide a predetermined indication on amount meter 20 during calibration.

The signal tapped off potentiometer 64 is applied to an emitter follower and integrating amplifier circuit 66. The emitter follower provides impedance matching and isolation and the integrating amplifier integrates the pickup velocity signal to convert it to a displacement signal. The displacement signal on the output of circuit 66 is then fed in parallel to two synchronous detectors 68 and 70. These synchronous detectors are actually electronic switches driven 90° out of phase with each other at the speed of the engine under test.

Let us now look at the manner in which the synchronous detectors 68 and 70 are driven. The fiiring pulses picked up by the spark plug transducer 14 in the reference channel are extremely narrow and of low and varying amplitude. These pulses are shown in FIGURE 13. The output pulses from pickup 14 are fed to a pulse stretcher and amplifier 72 which stretches or widens the pulses and also amplifies them to a constant amplitude as shown in FIGURE 14. They are then fed to a ramp generator 74 which converts the pulses to a sawtooth wave form. The maximum amplitude of the teeth vary with engine speed. The sawtooth wave form is illustrated in FIGURE 15. The output signals from the ramp generator 74 drive an emitter follower and Schmitt trigger circuit 76. The emitter follower again provides impedance matching and isolation and the Schmitt trigger responds to the voltage signals to provide a well defined constant amplitude square wave corresponding in time to the plug pulses as shown in FIGURE 16.

The square waves from circuit 76 are applied to a differentiator and pulse doubler circuit 80 which operates upon the leading and trailing edge of each square wave to provide two sharp spikes or pulses for each pulse originally sensed by plug pickup 14. These pulses are originally alternately positive and negative as shown in FIGURE 17. Subsequently, the negative pulses are inverted so that the output of circuit 80 is a train of uniform positive pulses as shown in FIGURE 18. Since the pulses at pickup 14 occur at the rate of only one for every two cycles of engine revolution, the output pulses from circuit 80 have a repetition rate corresponding to the actual speed of the engine. These sharp pulses are then applied to another ramp generator 82 to provide a sawtooth wave form at the engine frequency as shown in FIGURE 19. The output of ramp generator 82 is fed to another emitter follower and Schmitt trigger 84 which produces a square wave signal (FIGURE 20) have a frequency equal to the engine speed. The square wave signal is applied to a low pass filter 86 having a cutoff frequency of 40 cycles per second. This low pass filter converts the square wave to a sine wave as shown in FIGURE 21 and provides phase shift to the reference signal equal to that given the front and rear pickup signals by the low pass filters in those channels. The output signal from low pass filter 86 is fed to a 90° phase shifter 90 which produces two sine wave outputs separated by 90° in phase as shown in FIGURE 22. The output signals from phase shifter 90 are applied to Schmitt trigger 92 and to another Schmitt trigger 88. The output of low pass filter 86 is also applied to a terminal 93 which may be connected to a calibrator (not shown).

Schmitt triggers 88 and 92 then provide square waves 90° out of phase with each other as shown respectively in FIGURES 24 and 23. The square wave from Schmitt trigger 88 drives synchronous detector 68 and the square wave from Schmitt trigger 92 drives the synchronous detector 70. Both Schmitt triggers are switching at engine speed, i.e., 25 cycles per second. In effect, the synchronous detectors are then looking at the input rotor unbalance signal at points 90° displaced from each other. Furthermore, the ssynchronous detectors function as highly selective filters to pass only signals at 25 cycles per second All even harmonics of the unbalance signal frequency are blocked by the synchronous switching action. It will be recalled that the sharp cutoff low pass filter 24 has already effectively blocked at least the third and higher harmonics of the vibration signal derived from the front pickup 15. If not filtered these odd harmonics would pass through the synchronous detectors attenuated to a fractional value corresponding to the order of the harmonic.

Besides the selective filtering action, the synchronous detectors also function to provide signals representing the vector or 90° components of the vibration unbalance signal appearing at the inputs of the synchronous detectors 68 and 70. These component signals actually appear as DC levels on the outputs of the synchronous detectors. For example, if the position of the unbalance were such that the angle X equals zero, one synchronous detector would have a maximum DC output and the other synchronous detector would have a zero DC output. If the angle X were 45°, both synchronous detectors would have the same DC level output. If the angle were 90°, the first synchronous detector would have a zero output and the second synchronous detector a maximum output.

In order to render the DC levels usable in subsequent circuitry, they are chopped or modulated at the rate of 1000 cycles per second. Chopping is accomplished by feeding the output of synchronous detector 68 to a solid state chopper 94 and the output of synchronous detector 70 to a solid state chopper 96. These choppers are also driven via conductors 99, 101, 103, 105 and 107 by the output of a 1 kc. reference oscillator circuit 98.

It is now desired to combine the two outputs of the solid state choppers 94 and 96 into one alternating current signal. These outputs are vectorially combined in an induction resolver 100. The details of one suitable form of resolver are disclosed in a "Resolver Handbook" published by Reeves Instrument Corporation Rico Bulletin #57. Resolver 100 in conjunction with potentiometer 102 and capacitor 109 functions to vectorially combine the two vector component signals from choppers 94 and 96 to a single AC signal whose amplitude is proportional to the amount of unbalance W and whose phase relative to the output of the 1 kc. reference oscillator is proportional to the unbalance position or angle X. The resolver rotor can be adjustably moved relative to the stator to provide position calibration during the setup procedure.

The AC output of resolver 100 is fed to an isolating and impedance matching emitter follower stage 104 whose output is fed to a 1000 cycle sharply tuned amplifier 106. The output of this amplifier is a very clean 1000 cycle sinusoidal signal representing the amount and position information sensed by the front velocity pickup 15. This signal is further shaped by a clamp-clip and emitter follower circuit 108. The clamp-clip circuit provides symmetrical clipping when too large (offscale) a signal is applied to the input. This prevents great error in the position meter readings for such overloading signals. Signals from circuit 108 are fed to one input of an audio mixer 110 and also via a conductor 112 to a phase shifting resolver 114' in the rear channel of the analyzer. The 1 kc. signal is also mixed in the audio mixer 110 with a rear-to-front cross effect correction signal derived from the rear channel via a conductor 116 connected to another input of audio mixer 110.

This rear-to-front cross effect signal is derived from the clamp-clip and emitter follower circuit 108' in the rear channel. The 1 kc. rear plane unbalance signal from circuit 108' is applied via a conductor 112' to a resolver 114 which functions as an adjustable phase shifter. The rotor of resolver 114 is adjusted to vary the position or phase of the rear-to-front cross effect correction signal applied to the front channel. The correction signal is applied through a phase shifting network 118 and 119 on the output of resolver 114 to an impedance matching and isolating emitter follower stage 120. Potentiometer 118 and capacitor 119 function as a 90° phase shift circuit in which the resistance of potentiometer 118 is made equal to the reactance of capacitor 119 at the chopping frequency so that the two signals from the output windings of the induction resolver are vectorially combined.

An adjustable potentiometer 122 is used to vary the amplitude or amount of the correction signal applied via conductor 116 to the audio mixer 110. This correction signal is mixed with the front unbalance signal from circuit 108 in order to correct the 1000 cycle front channel signal for cross effect, i.e. for unbalance vibrations sensed by the front velocity pickup 15 but attributable to an unbalance in the rear correction plane rather than in the front correction plane. The cross effect is determined during the calibration of the analyzer and the operator adjusts the resolver 114 and potentiometer 122 to provide a correction signal of the proper phase and amplitude to compensate for the cross effect.

The corrected 1000 cycle front unbalance signal is applied across a full wave diode bridge rectifier 124 which is connected to the DC voltmeter 20 which is calibrated to indicate the front amount or weight W in ounces.

The output of mixer 110 is also applied to a Schmitt trigger 126 which converts the 1 kc. sinusoidal signal to a 1 kc. square wave signal which in turn is applied to flip-flop phase meter driver 128. Also applied to driver 128 via conductors 132, 134 and 135 is the 1 kc. square wave output from the reference oscillator and emitter follower circuit 98. Flip-flop phase meter driver circuit 128 functions to compare the phase of the output from Schmitt trigger 126 with the phase of the reference 1 kc. signal from reference oscillator 98 to produce a signal which is proportional to the difference in phase of the two square wave signals. This signal is aplied to the meter 18 which indicates the front position corresponding to the angle X or the position with respect to the reference point R where the weight W must be placed to balance the engine.

The rear channel components connected between the rear velocity pickup 16 and the rear amount meter 22 and rear position meter 21 are identical in structure and function to the components of the front channel and consequently will not be discussed in detail. The rear channel components carry the same reference numerals followed by a prime as their corresponding components in the front channel. Furthermore, the cross effect correction circuits in the rear channel is identical to that of the front channel. In other words, the rear velocity pickup 16 will sense some unbalance vibrations which are attributable to an unbalance in the front correction plane. Consequently, the rear unbalance signal appearing at the output of the clamp-clip and emitter follower circuit 108' is mixed in the audio mixer 110' with a front-to-rear cross effect correction signal derived from the front channel via conductor 112. The correction signal is applied to a phase shifting resolver 114' which adjusts the phase of the correction signal to compensate for the position or angle of the cross effect. The corrected signal is applied through the emitter follower stage 120' and potentiometer 122' to the audio mixer 110' where it is mixed with the 1 kc. rear unbalance signal to produce a resultant or corrected rear unbalance signal. Potentiometer 122' may be adjusted to vary the amount of the cross effect correction signal applied to the rear channel.

In the particular embodiment being disclosed, the engine speed is desirably maintained within the range of 1200 to 1800 r.p.m. before the analyzer circuit is activated. The analyzer circuit is automatically controlled so that it is disabled when the engine is running outside of this speed range.

The engine speed signal from the plug pickup 14 is tapped off the output of the emitter follower and Schmitt trigger circuit 84 and applied via a conductor 140 to a one shot multivibrator and pulse integrating circuit 142 which effectively counts the firing pulses to produce a DC voltage proportional to the speed of the running engine. This DC voltage is applied to the tachometer 23 to provide a visual indication of the engine speed. This voltage is also applied to an emitter follower and chopper 144 which provides impedance matching and isolation and also chops the voltage signal from circuit 142 at the rate of 1000 cycles per second. The chopper is driven via conductors 146 and 135 by the 1 kc. square wave output of reference oscillator 98. The chopped output from circuit 144 is applied to an amplifier and emitter follower circuit 148 and then to a voltage doubling rectifier circuit 150 which provides a DC control signal to an SCR relay driver and tachometer control circuit 152 which energizes a relay circuit to disable the engine analyzer when the engine speed falls outside the range of 1200 to 1800 r.p.m. chosen in this particular embodiment.

A solenoid 154 is connected to the output of the SCR relay driver. When the engine is running in the range of 1200 to 1800 r.p.m., there is no output from the SCR relay driver and the solenoid is deenergized. However, when the engine speed is not in this range, the output from voltage doubling rectifier circuit 150 is sufficienlty high to fire the SCR relay driver, and solenoid 154 is energized.

Figure 4:
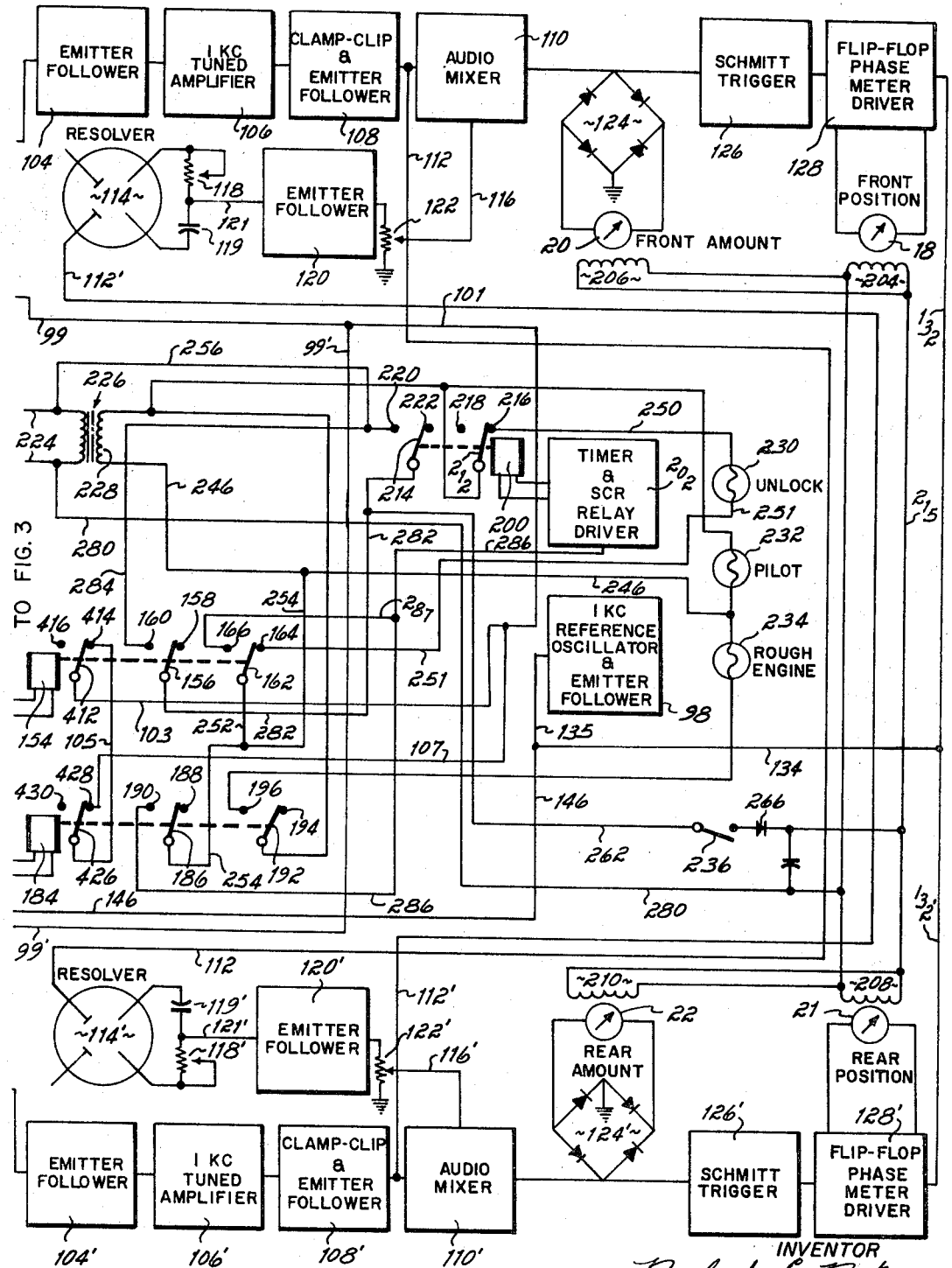
FIGURE 4 is a block diagram of the remaining portion of the present analyzer circuit.

In FIGURE 4 the switch contacts actuated by solenoid 154 are shown in their normal position, i.e. when engine speed is in the range of 1200 to 1800 r.p.m. and the solenoid is deenergized. Switch arm 156 is adapted to be actuated by solenoid 154 between fixed contacts 158 and 160. Switch arm 162 is adapted to be actuated between fixed contacts 164 and 166. Switch arm 412 is adapted to be actuated between fixed contacts 414 and 416.

It was also previously mentioned that the analyzer circuit is disabled when the engine roughness exceeds a predetermined level. The output of front velocity pickup 15 is fed via conductor 170 to one input of an audio mixer 172, and the output of the rear velocity pickup 16 is fed via conductor 174 to the other input of the mixer 172. Consequently, the inputs to mixer 172 are two signals representing the total engine vibration sensed by the front and rear velocity pickups 15 and 16 respectively.

In the mixer 172 these signals are combined to form a resultant signal which is passed through a low pass filter 176 having an upper cutoff frequency of 20 cycles per second. Vibrations from engine roughness caused by misfiring of the spark plugs and by other ignition and combustion faults, have a fundamental frequency corresponding to half the speed of the running engine. Consequently, low pass filter 176 has an upper cutoff frequency of one-half of the cutoff frequency of filters 24 and 24'. The signal output of filter 176 is amplified, shaped and rectified by an amplifier and emitter follower stage 178 and a voltage doubling rectifier circuit 180. This roughness signal is then applied to a threshold voltage sensitive SCR relay driver circuit 182 which completes a direct current circuit through solenoid 184 when the roughness signal exceeds a predetermined value. The switch arms of solenoid 184 are shown in FIGURE 4 in their normal, or deenergized, condition. However, when solenoid 184 is energized, switch arm 186 moves from the fixed contact 188 to the fixed contact 190, switch arm 192 moves from contact 194 to contact 196, and switch arm 426 moves from contact 428 to contact 430.

The front and rear position and amount meters 18, 20, 21 and 22 are preferably locking type meters which have integral locking coils 204, 206, 208 and 210. Each of these locking coils, when energized, clamps the face of the meter against the needle to lock the meter reading. The meter coils are energized and the meters are locked whenever a 110 volt DC potential is applied to line 215. A circuit can be completed to line 215 from power line 256 either through movable contact arm 214 of solenoid 200 or movable contact arm 156 of solenoid 154.

As is explained in detail below, these solenoids function in conjunction with one another so that the meters are initially locked and are held locked until the engine is brought within the preselected test range, for example, 1200–1800 r.p.m. The meters are then unlocked for a predetermined time; for example, 5–10 seconds, to permit indications of the various quantities being measured. Thereafter, the meters are locked and remain locked with their previous indications showing until such time as the engine is dropped out of the speed range and either the same or another engine is brought back into the range.

When the engine is first started up, solenoid 154 is energized because the engine speed is below 1200 r.p.m., the lower limit of the preselected test range. Solenoid 154, when energized, shifts contact arm 156 from contact 158 to 160. This completes a circuit from power line 256 through lead 284, contact 160, contact arm 156, lead 282, lead 262, manual switch 236 and rectifier 266 to line 215. A connection to the opposite power line is made through lead 280. As the engine is brought up into its proper speed range, solenoid 154 is deenergized. This shifts contact arm 156 from contact 160 opening the 110 volt line to release the meter locks.

It is to be understood that so long as solenoid 154 is energized, a second switch arm 162 of the solenoid is in engagement with contact 166, thereby grounding lead 286 which is connected to an SCR in timer and relay driver circuit 202. The timer and SCR relay drive circuit 202 includes an RC pumping circuit which, as is explained below, is effective to energize relay 200 a predetermined time after the ground connection is removed from lead 286. This ground connection is in fact broken when relay 154 is deenergized and contact arm 162 is separated from contact arm 166. This occurs when the engine has entered the predetermined speed range, i.e. the 1200–1800 r.p.m. range in the present example. After the engine has operated for a time within this range, solenoid 200 is energized from circuit 202. This causes switch arm 214 to be shifted into engagement with contact 220 which again completes a circuit to the meter locking coils 204, 206, 208 and 210 through line 215. The coils are thus locked to hold the unbalance readings. For as soon as the engine drops out of the speed range, relay 154 is reenergized to reestablish a circuit to the locking meters through contact 156. Thus, when relay contact 162 closes, and control lead 286 causes solenoid 200 to be deenergized, the opening of contact 220 and relay arm 214 has no effect on the meter lock-in windings. Thus, the engine may be shut down and the meter readings noted at a later time.

As shown in FIGURE 4, a step-down transformer 226 is connected to source 224 and provides 6.3 volts AC on its secondary winding 228. The 6.3 volt AC is utilized to energize the "unlock" indicator lamp 230, the "pilot" indicator lamp 232, and the "rough engine" indicator lamp 234. The unlock lamp 230 is energized when switch arm 212 of the solenoid 200 engages fixed contact 216 and switch arm 162 of solenoid 154 is in engagement with fixed contact 164. Arm 212 is ganged with arm 214 and thereby completes a circuit through lamp 230 every time solenoid 200 is in its "unlock" position, and solenoid 154 is deenergized by being in the balancing speed range. Pilot lamp 232 is energized whenever the power source 224 is connected to the analyzer. Rough engine lamp 234 is energized through contact 196 whenever solenoid 184 is energized, by an excessive amount of engine roughness. This automatic meter locking function provided by solenoids 154, 184 and 200 is enabled by closing the manual switch 236. When switch 236 is open, the locking circuit is interrupted and the meters remain unlocked regardless of the speed or roughness of the engine.

The operation of the automatic feature of the analyzer circuit will now be described in more detail. Let us first assume that the engine has just been started and is running below the predetermined speed range of 1200 to 1800 r.p.m., and the engine roughness is below the predetermined maximum permissible level so that solenoid 154 is energized and solenoid 184 is deenergized. Consequently, the switch arms 186, 192 and 426 of solenoid 184 are in their normal positions as shown in FIGURE 4.

However, since solenoid 154 is energized, switch arm 162 engages fixed contact 166, switch arm 156 engages fixed contact 160 and switch arm 412 engages fixed contact 416. A circuit is then completed from the upper side of power source 224 via conductors 256 and 284, contact 160, switch arm 156, conductor 282, conductor 262, switch 236 and diode 266, through the meter locking coils 204, 206, 208 and 210, and back via conductor 280 to the other side of power source 224. The meter needles are thereby locked so they are not damaged by excessive vibrations which may occur during start-up. It will also be noted that movement of switch arm 162 into engagement with fixed contact 166 interrupts the circuit through the unlock lamp 230, thereby extinguishing this lamp. Furthermore, time and SCR relay driver circuit 202 is deactivated because its control circuit is grounded through a path including conductors 252 and 254. In addition, the circuit between the 1 kc. oscillator circuit 98 and the choppers 94, 96, 94′, 96′ is interrupted because switch arm 412 has moved from contact 414 to contact 416.

When the engine attains the proper speed, solenoid 154 is deenergized since the voltage from circuit 150 is insufficient to activate the SCR relay driver circuit 152. Consequently, switch arm 412 engages contact 414 to connect choppers 94 and 96 to the 1 kc. oscillator 98 via conductors 99, 101, switch arm 412, fixed contact 414, conductor 105, switch arm 426, fixed contact 428 and conductor 107. Choppers 94 and 94′ are similarly connected via conductor 99′.

Furthermore, switch arm 162 moves to fixed contact 164 to open the circuit between conductor 286 and ground, thereby initiating potential build-up on an SCR in circuit 202 due to the R-C pumping action explained below. It requires an interval of from five to ten seconds to build up a sufficient voltage on the SCR in circuit 202 to trip solenoid 200. During this interval the meter coils are unlocked. In addition, switch arm 162 moves to contact 164 to connect the lower side of unlock lamp 230 to the lower side of the transformer secondary 228 via conductors 251, 252, 254 and 246.

After the predetermined time interval has expired, the relay driver of circiut 202 is fired and energizes solenoid 200. When solenoid 200 is actuated, switch arm 214 moves to fixed contact 220 to close the circuit between power source 224 and the meter locking coils 204, 206, 208 and 210 to relock the meters, and switch arm 212 moves to fixed contact 218 so that lamp 230 is not illuminated.

When relay 154 is subsequently reenergized due to the engine dropping out of the speed range, line 286 is shorted and the SCR relay driver of circuit 202 deenergizes solenoid 200 and returns its switch arms to the normal positions shown in FIGURE 4. The locking coils are maintained energized through the contacts of relay 154 so that the meter indicating needles remain clamped at the unbalance values being read. The meters will not unlock again unless the engine speed varies outside the predetermined speed range and then is returned again to that range. Consequently, the engines may be shut down and the meter readings studied later.

In a similar manner, when egine roughness exceeds the predetermined maximum level such that solenoid 184 is energized, the front and rear channels are disabled and the front and rear unbalance meters are also locked by energization of their locking coils. When solenoid 184 is energized, switch arm 426 is moved to fixed contact 430 to interrupt the circuit between the 1 kc. oscillator 98 and the choppers 94, 96, 94′ and 96′. Switch arm 186 is also moved into engagement with fixed contact 190 to ground conductor 286 of the timer and SCR relay drive circuit 202, thereby preventing energization of solenoid 200. Furthermore, switch arm 192 is moved into engagement with fixed contact 196 so that the rough engine indicator lamp 234 is energized from the secondary winding 228 via switch arm 192 and fixed contact 196, thereby illuminating the lamp 234.

When the engine roughness falls below the maximum permissible level, solenoid 184 is dennergized and reestablishes a circuit between the 1 kc. oscillator and choppers 94, 96, 94′ and 96′. Also, switch arm 186 moves from contact 190 to remove ground from conductor 286, permitting circuit 202 to actuate solenoid 200 as explained above.

Figure 3:
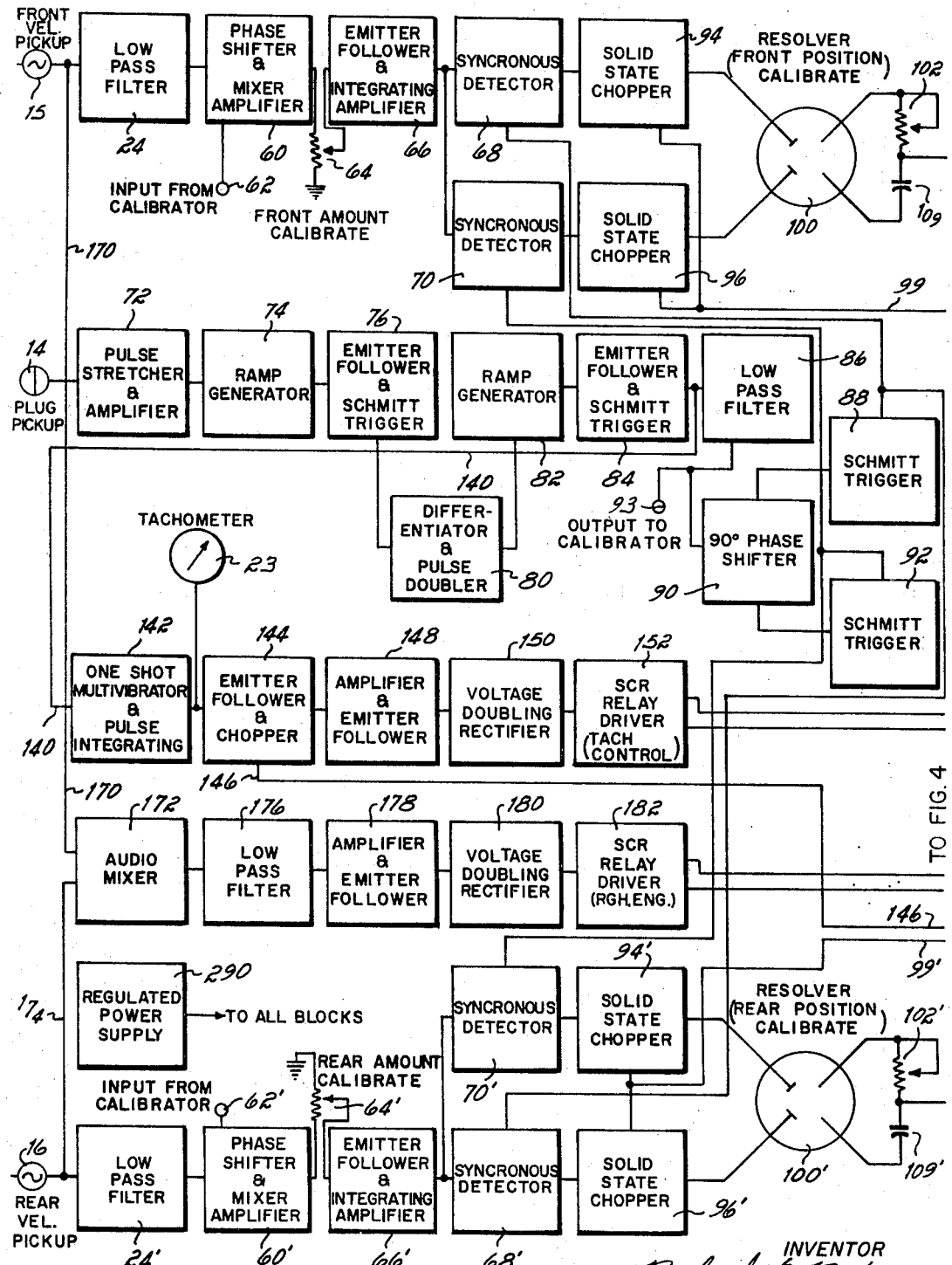
FIGURE 3 is a block diagram of a portion of the present analyzer.

A regulated power supply 290 supplies DC operating potentials to all the circuit components shown in FIGURES 3 and 4. As will be explained below, additional sets of switch contacts may be operated by solenoids 154 and 184 to remove the power supply from the electronic components of the analyzer when engine speed or roughness are not within their proper ranges.

Let us now look at FIGURES 5-12 which show the circuit diagrams of the electronic components illustrated in FIGURES 3 and 4. Dashed lines have been used in FIGURES 5-12 to include portions of the circuits corresponding to the component blocks of FIGURES 3 and 4. The encluosed circuits carry the same reference numerials as the corresponding blocks in FIGURES 3 and 4. The following discussion refers to the front channel which is identical to the rear channel. (Component blocks in the rear channel are given the same numbers as corresponding component blocks in the front channel with prime marks added.)

In FIGURE 5, the front velocity pickup 15 is shown electrically connected to the low pass M-derived filter 24 which is shown as comprising a twin-T network 300, a high input impedance two-transistor emitter follower stage 301, and a low pass R-C and emitter follower network 302. The values of the various circuit elements are chosen to provide the required 40-cycle per second upper cutoff frequency for an engine speed in the range of 1200–1800 r.p.m. It will be understood that if the device is tested in a different speed range, the filter components are chosen accordingly.

Filter 24 is connected via a capacitor 303 to an inverter stage 304 in circuit 60. The output of this stage is applied to a transistor mixer stage 305. Circuit 60 functions to introduce a phase shift in the signal applied thereto. This phase shift is equal to and varies with speed such that it compensates for the shift introduced by phase shift circuit 90 in the reference channel. The input from a calibrator conector 306 is also applied via a conductor 308 to the terminal 62 of the mixer stage 305. The calibrator (not shown) is not a part of the present invention but generally functions to apply to mixer 305 voltages corresponding to known unbalance amounts and positions to obtain a null so that the unbalance meters may be calibrated. The potentiometer 64 may be manually adjusted until the front amount meter 20 indicates the weight corresponding to a known weight applied to the engine in the set-up procedure.

Figure 6:
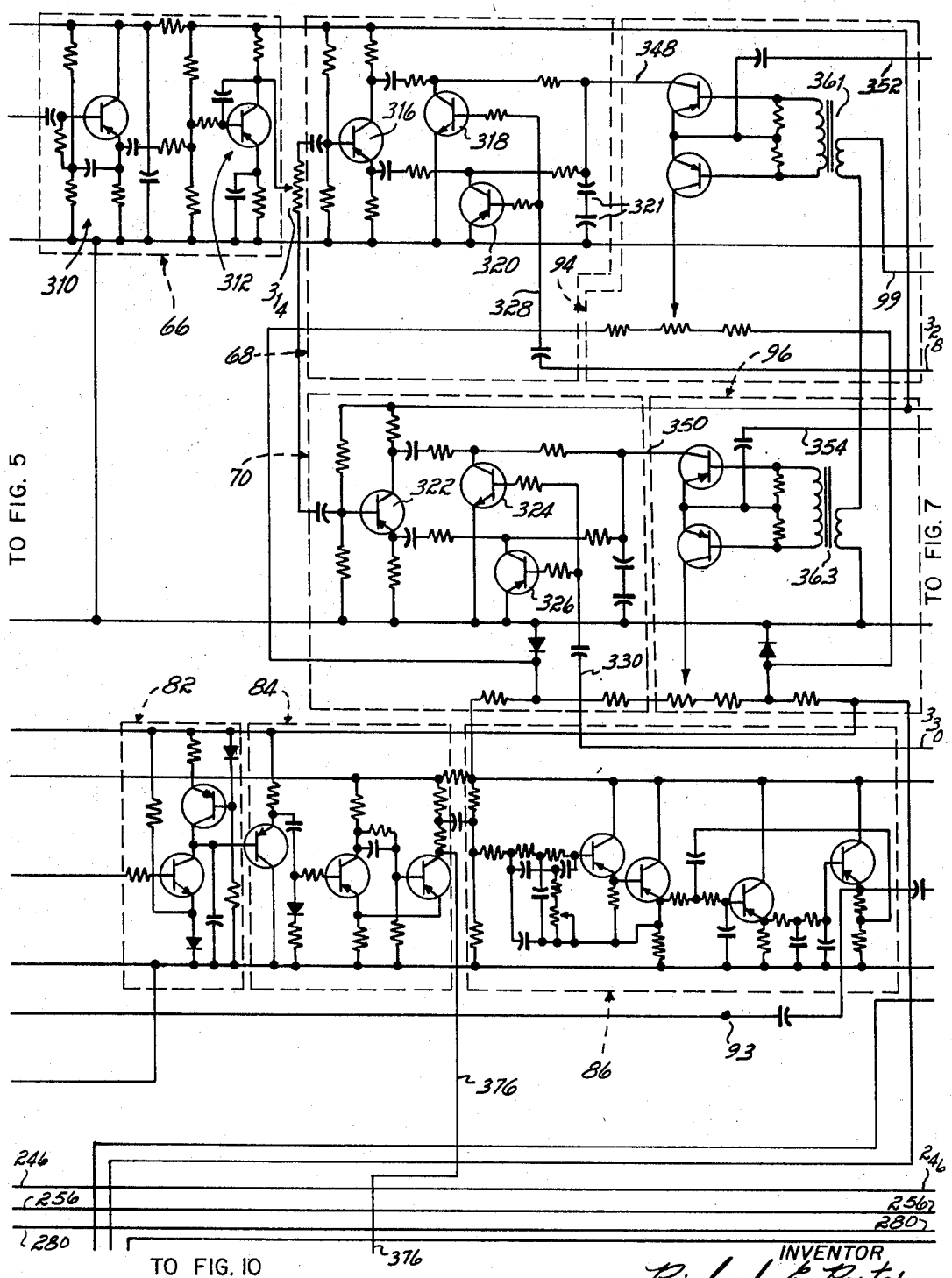
FIGURE 6 is a schematic circuit diagram of a portion of the present analyzer circuit including the synchronous detectors and choppers of the front channel.
Figure 7:
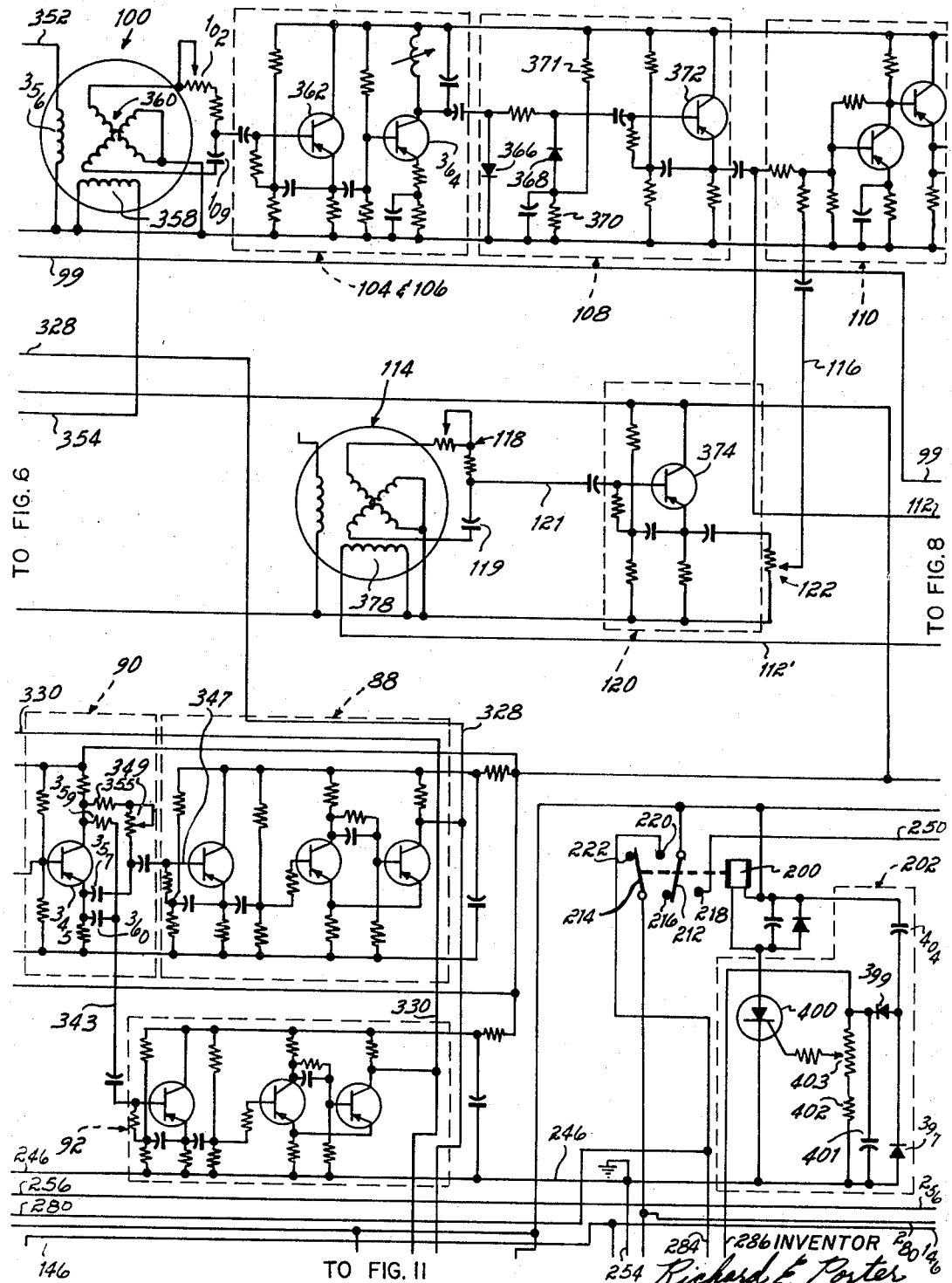
FIGURE 7 is a schematic circuit diagram of a portion of the present analyzer circuit including the two resolvers in the front channel.
Figure 8:
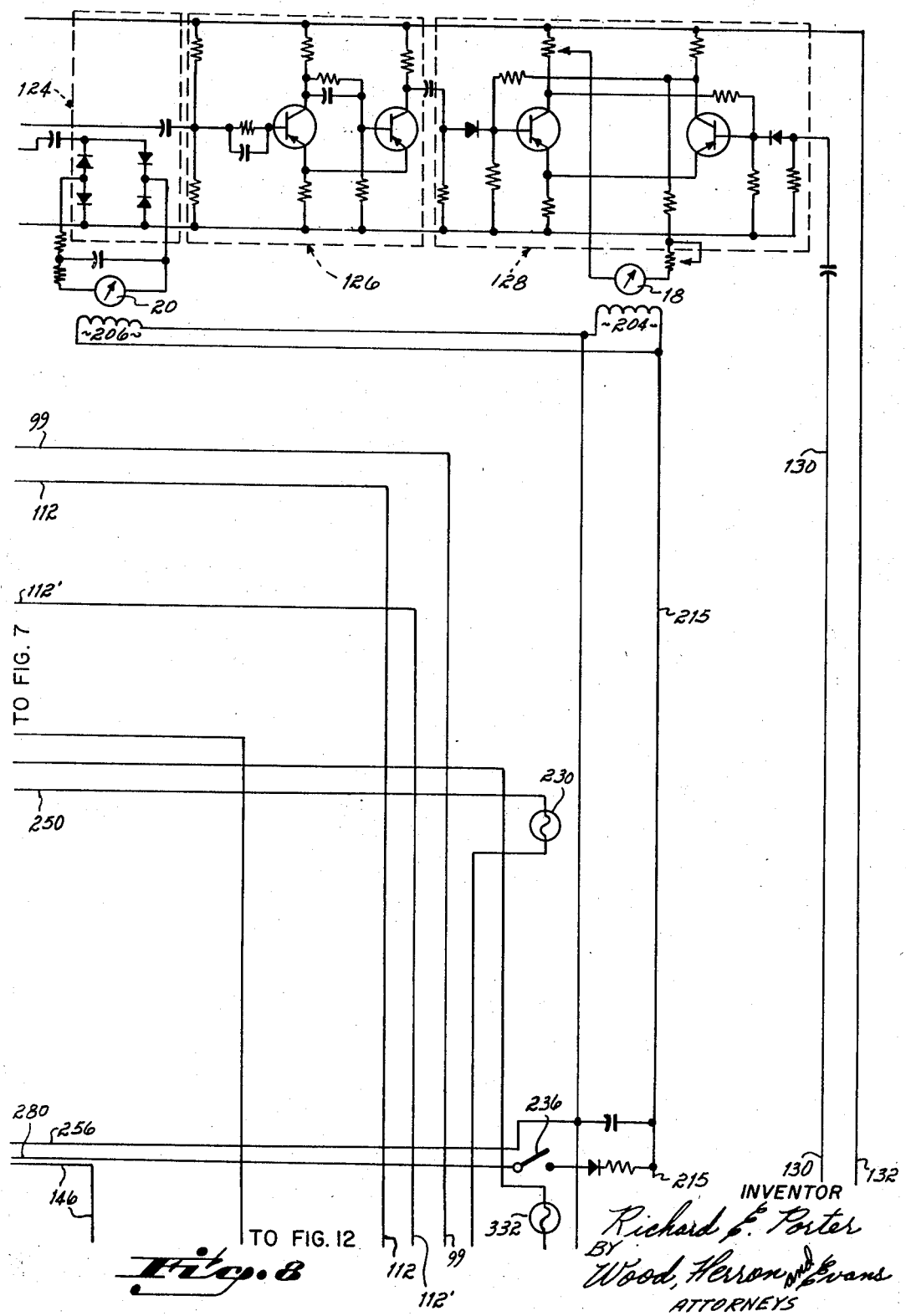
FIGURE 8 is a schematic circuit diagram of a portion of the present analyzer circuit including the circuits to the front "amount" meter and front "position" meter.
Figure 9:
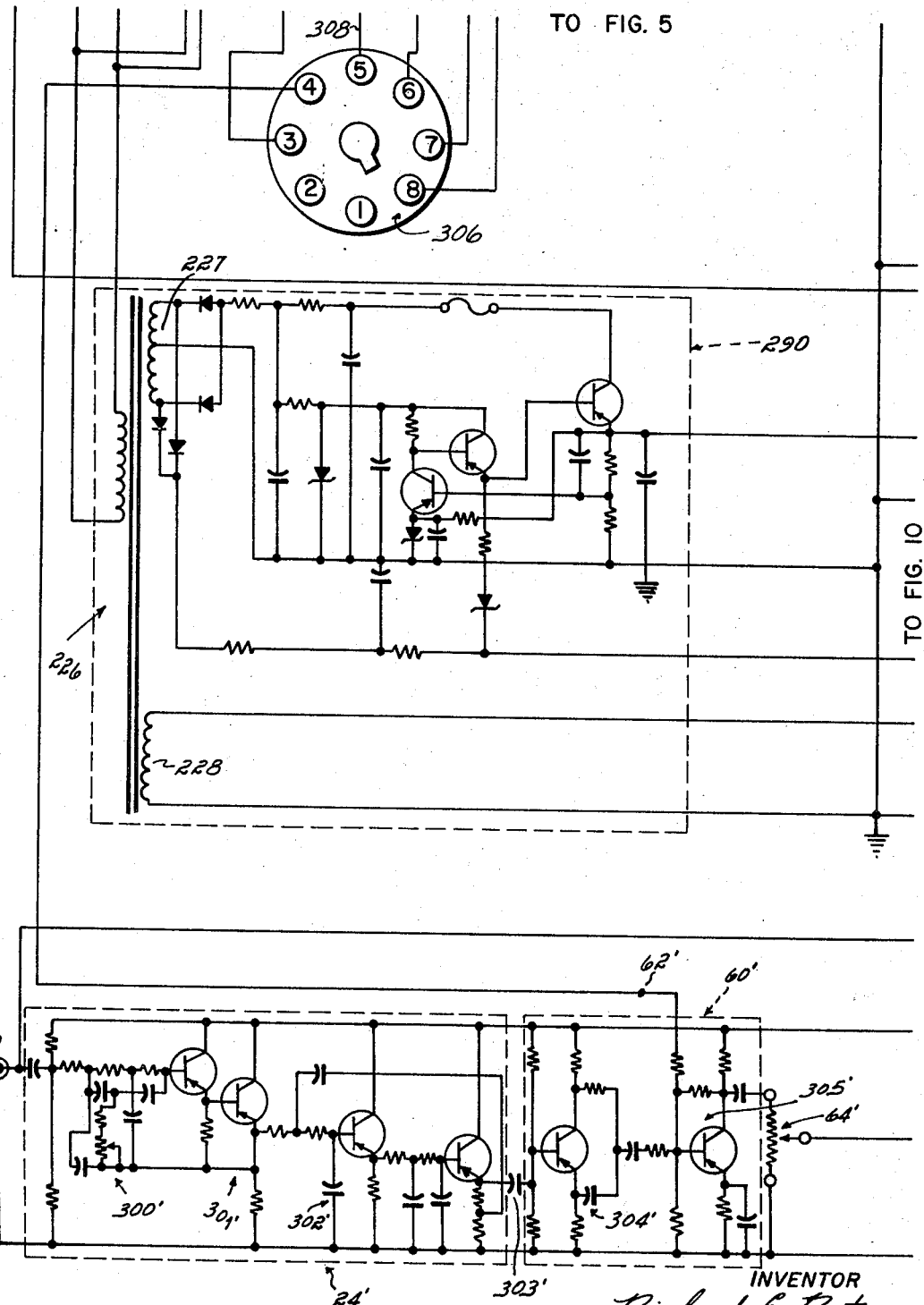
FIGURE 9 is a schematic circuit diagram of a portion of the present analyzer circuit including the input connection from the rear pickup.
Figure 10:
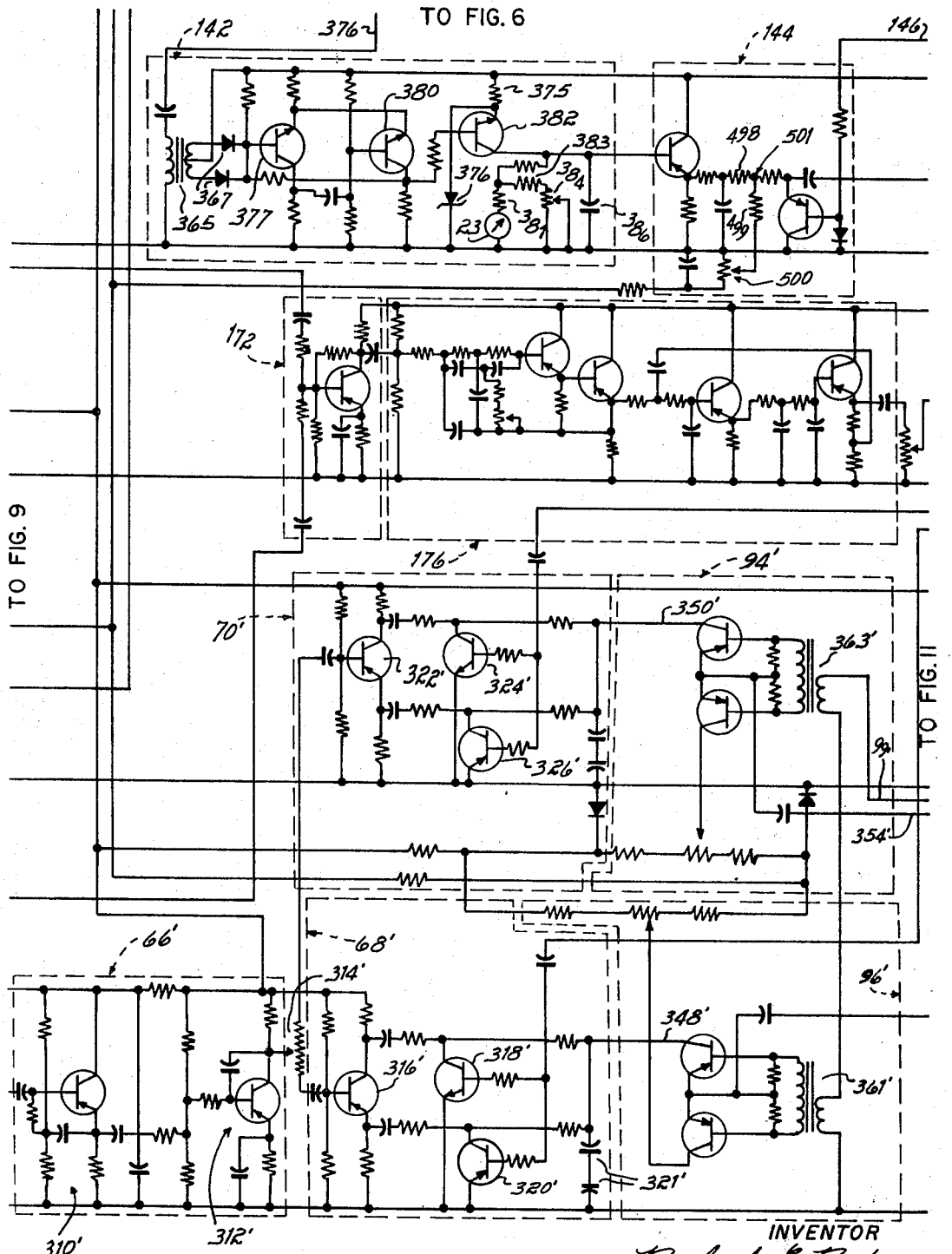
FIGURE 10 is a schematic circuit diagram of a portion of the present analyzer circuit including the synchronous detectors and choppers of the rear channel.

The filtered front pickup signal is then applied to a high impedance emitter follower stage 310 in circuit 66 (FIGURE 6). The output from this emitter follower is applied to a transistor integrating amplifier stage 312 which integrates the filtered pickup signal, thereby effectively converting it from a velocity signal to a displacement signal. The output of circuit 66 is split by means of an adjustable voltage divider 314 and fed in parallel to the synchronous detectors 68 and 70.

Synchronous detector 68 contains as active components the three transistors 316, 318 and 320. Transistor 316 has both collector and emitter outputs and thereby provides both an in-phase and an out-of-phase or inverted output with respect to its input. The in-phase output signal is derived from the emitter and applied to the collector of PNP transistor 320. The inverted output signal is applied to the collector of the NPN transistor 318. Synchronous detector 68 is driven by a speed signal derived from the reference channel and plug pickup 14 and applied to the bases of transistors 318 and 320 via a conductor 328. The speed signal alternately switches transistors 318 and 320 on and off to sample the positive and negative half cycles of the unbalance signal applied to transistor 316. Transistors 318 and 320 alternately shunt the output signals from transistor 316 to charge capacitors 321 to voltages which correspond in amplitude to the amplitude of the unbalance signal at the time sampling occurs. Therefore, the DC levels applied to the output conductor 348 are indicative of both the amplitude and phase of the unbalance signal.

Synchronous detector 70 contains transistors 322, 324 and 326 which correspond in function to transistors 316, 318 and 320 respectively, and is driven by the same speed signal shifted 90° and applied via a conductor 330 to the bases of transistors 324 and 326.

The signal induced in the spark plug pickup 14 is a train of very narrow pulses of low amplitude which correspond in time to the firings of the spark plug. These pulses, which are shown in FIGURE 13, must first be shaped and amplified before they are usable as a speed reference signal to drive the synchronous detectors 68 and 70 and the tachometer control circuit 152.

These pulses are first applied to circuit 72 (FIGURE 5) which includes a pulse stretching stage comprising a transistor 332 and a capacitor 334. The stretched pulse is then fed to a transistor amplifier stage 336 whose emitter carries a high negative bias to eliminate any other pulses lower in amplitude than the one due to the No. 1 spark plug firing. The positive stretched output pulses from amplifier 336, as shown in FIGURE 14, are capacitively coupled to the ramp generator 74 which generates a positive ramp or sawtooth waveform proportional to the time between successive stretched pulses. The transistor 337, a constant current regulator, is normally conducting to linearly charge a capacitor 338 to the maximum voltage attained by the ramp. When a positive stretched pulse is applied to the base of NPN transistor 339, this transistor conducts to discharge capacitor 338 therethrough. The capacitor again charges to provide another ramp voltage and is discharged by the next stretched pulse. The sawtooth wave output from the ramp generator is shown in FIGURE 15.

The voltage on capacitor 338 is applied to circuit 76 which has as its first stage the isolating emitter follower 329 whose output is applied to a voltage sensitive Schmitt trigger comprising the transistors 340 and 342. The input connection to the Schmitt trigger comprises the series connection of a capacitor 331, a diode 333 and a resistor 335. The values of these components are chosen so that they form a symmetrical clamping circuit. This symmetrical clamping circuit functions so that the ramp wave output from ramp generator 74 has substantially the same positive and negative amplitudes relative to a zero voltage line. The output of circuit 76 (FIGURE 16) is a clean square wave synchronized with the poorly shaped pulses originally derived from the plug pickup 14.

Since these plug pickup signals occur at a frequency corresponding to one-half the running speed of the engine, it is necessary to double their repetition rate. This doubling is accomplished by applying the square wave output from the Schmitt trigger in circuit 76 to a peaking transformer 344 in the differentiator and pulse doubler circuit 80. Transformer 344 and the small input coupling capacitor 353 effectively differentiate the square wave to provide positive and negative spikes at the leading and trailing edges, respectively, of each half cycle of the square wave. This is shown in FIGURE 17. Diodes 346 rectify these pulses so that only positive spikes occurring at a frequency of twice that of the square wave appear at the output of circuit 80 as illustrated in FIGURE 18.

These spikes are converted to voltage signals by applying them to another ramp generator 82 which functions like generator 74 to provide a sawtooth waveform (FIGURE 19) which is used to trigger another Schmitt circuit 84 whose output is a square wave (FIGURE 20) having a frequency twice the square wave of the output of circuit 76. Therefore, the square wave of the output of circuit 84 has a frequency corresponding to the running speed of the engine under test. In other words, if the engine is running at 1500 r.p.m., the square wave output of circuit 84 has a frequency of 25 cycles per second.

This 25-cycle square wave is capacitively coupled to another low pass filter 86, identical to L.P. filter 24, having an upper cutoff frequency of 40 cycles per second. The output of the filter, a sine wave as shown in FIGURE 21, is capacitively coupled to the 90° phase shifting circuit 90 (FIGURE 7) which comprises a transistor 345 and two R-C networks. One R-C network comprises a fixed resistor 355, a capacitor 357 and potentiometer 349. The second network comprises a fixed resistor 359 and a capacitor 360. One of the R-C networks is connected via a conductor 347 to the Schmitt trigger circuit 88 and the other of which is connected via a conductor 343 to the Schmitt trigger circuit 92. The outputs on conductors 347 and 343 adjusted by a potentiometer 349 so that they shift 90° in phase relative to each other.

These phase shifted signals trigger Schmitt triggers 88 and 92 which produce square waves at the frequency of the engine speed and 90° out of phase with each other. The square wave speed signal from Schmitt trigger 88 is applied via conductor 328 in parallel to the bases of transistors 318 and 320 in the synchronous detector 68. The square wave speed signal from Schmitt trigger 92 is applied via conductor 330 to the bases of transistors 324 and 326 in the synchronous detector 70. The output of synchronous detector 68 is a DC voltage on conductor 348 and the output of synchronous detector 70 is a DC voltage on conductor 350.

These DC voltage signals are chopped by the transistor choppers 94 and 96 respectively. As shown, the transformers provide 1 kc. drive to the chopper transistors. Transformers 361 and 363 are connected to the 1 kc. reference oscillator and emitter follower circuit 98 through conductors 99 and switches of solenoids 184 and 154. The chopped signal appears on conductor 352 from chopper 94 and on conductor 354 from chopper 96. The outputs of these two choppers represent the vector components of the front velocity pickup signal. These signals are applied by conductors 352 and 354 to the input, or stator, windings 356 and 358 of the induction resolver 100, which windings are disposed at right angles to one another. The rotor windings of the resolver are also placed at an angle of 90°. Moving the rotor with respect to the stator allows the lengths of the vector components to be changed, thus allowing for position meter calibration when these components are added by the resistance-capacitor network, which forms a 90° phase shifting network that adds the outputs of the two rotor windings vectorially. Potentiometer 102 allows adjustment of this resistance so that it may be made equal to the capacitor reactance at 1 kc.

This AC signal is then applied to a high input impedance emitter follower transistor 362 whose output is applied to an amplifying transistor 364 having in its collector circuit an LC circuit sharply tuned to 1 kc. The sine wave output of the amplifier is then applied to circuit 108 comprising a diode 366 which clamps the positive portions of the input signal. This circuit also includes a diode-resistor circuit 368 and 370 which clips or limits the negative portion of overload signals to a predetermined negative value, depending upon the relative value of resistors 370 and 371. This portion of the circuit works on overloading signals to prevent large position meter errors. The output signals from the diode resistor network 368 and 370 are applied to an emitter follower transistor 372 which is a matching and isolating device, the output of which is applied to the low input impedance audio mixer 110. Audio mixer 110 also receives a rear to front correction signal. This signal is fed from circuit 108' in the rear channel to an input winding 378 of resolver 114.

Resolver 114 functions to take an input signal from winding 378 and to break that signal down into two vector components. These vector components have a magnitude, depending upon the rotational position of the rotor of the vector resolver 114, relative to winding 378. The outputs of the two windings of the vector resolver are vectorially added through the 90° phase shifting network and the potentiometer 118 adjusts the resistance equal to the reactance of the capacitor 119 so that the two output signals are effectively vectorially recombined. The output from the 90° shifting network is applied through line 121 to an emitter follower 120. This emitter follower includes transistor 374 whose output is applied to the low input impedance audio mixer 110 through potentiometer 122 and lead 116. As previously explained, this correction signal compensates the output of circuit 108 for vibrations sensed by the front velocity pickup but which are attributable to vibrations in the rear correction plane.

The compensated signal on the output of mixer 110 is then applied to the full wave diode bridge rectifier 124 connected to the front amount meter 20 which presents a visual indication of the amount of the unbalance or the weight W.

The output of circuit 110 is also appulied to a Schmitt trigger 126 which produces a square wave corresponding to the output of circuit 110. The square wave is capacitively coupled to the input of the two-transistor flip-flop phase meter driver 128 whose output is connected to the front position meter 18. Also applied to circuit 128 via conductor 130 is the output of the 1 kc. reference oscillator 98. Circuit 128 functions as a phase comparator in which the two transistors are alternately switched between their conducting and non-conducting states to produce a differential output proportional to the relative phase difference between the output signal of circuit 126 and the 1 kc. output signal from reference oscillator 98. Meter 18 is an integrating phase meter which coverts the differential output of circuit 128 to a visual readout indicating the position or angle X of the weight W with respect to the reference point R.

The rear channel is identical to the front channel and consequently will not be discussed further. However, it should be pointed out that the rear-to-front cross effect correction signal is derived from the output of circuit 108' in the rear channel and applied via the conductor 112' to one input winding 378 of the induction resolver 114 which functions as an adjustable phase shifter. The phase or position of the correction signal is varied by means of the adjustable rotor of the resolver 114 whose output is applied to potentiometer 118 and capacitor 119, a 90° phase shift adding circuit. The adjustable potentiometer 122 is used to vary the amplitude or amount of the correction signal which is fed via conductor 116 to the audio mixer 110.

Let us now look in more detail at the automatic speed control, engine roughness and meter locking circuits shown in FIGURES 5–12. As shown in FIGURE 6, the square wave output from the Schmitt trigger of circuit 84 is tapped off via a conductor 376 and applied to the input of circuit 142 (FIGURE 10) which comprises a one-shot multivibrator circuit including the transistors 377 and 380. It is to be understood that input transformer 365 and diodes 367 at the input of the multivibrator form two pulses for each input pulse in the same manner as the frequency doubler in the reference circuit. The multivibrator circuit has a switching time much less than the repetition rate of the pulses applied thereto. These constant amplitude, constant time duration positive pulses turn on transistor 382 (normally biased off by resistor 375 and Zener diode 376). Current through transistor 382 is proportional to the number of pulses; hence proportional to engine speed. Tachometer 23 reads this current through transistor 382 and provides a visual readout of the engine speed. Resistor 384 and fixed resistor 383 shunt the tachometer to provide for calibration. The capacitor 386 discharges through the tachometer circuit each time transistor 382 is turned off to prevent meter "flutter" at low engine speeds.

The negative voltage, proportional to speed, across capacitor 386 is also applied to the emitter follower and chopper circuit 144. This negative voltage, proportional to speed, is applied to resistor 498 where it is added to a fixed voltage fed through resistor 499 from potentiometer 500, called the range center control. Potentiometer 500 is set to give zero voltage at point 501 at the center of the speed range selected, e.g. at 1500 r.p.m. for the 1200 to 1800 range. The chopper is driven via conductor 146 by the output of the 1 kc. reference oscillator 98. The chopped speed signal is then applied through circuit 148 which includes an amplifier transistor 387 and an emitter follower transistor 388 and then to the voltage doubling, half wave rectifier circuit 150 (FIGURE 11) which provides positive voltage to the gate of SCR 390 whenever the engine speed is above or below the center range speed set by potentiometer 500.

Figure 11:
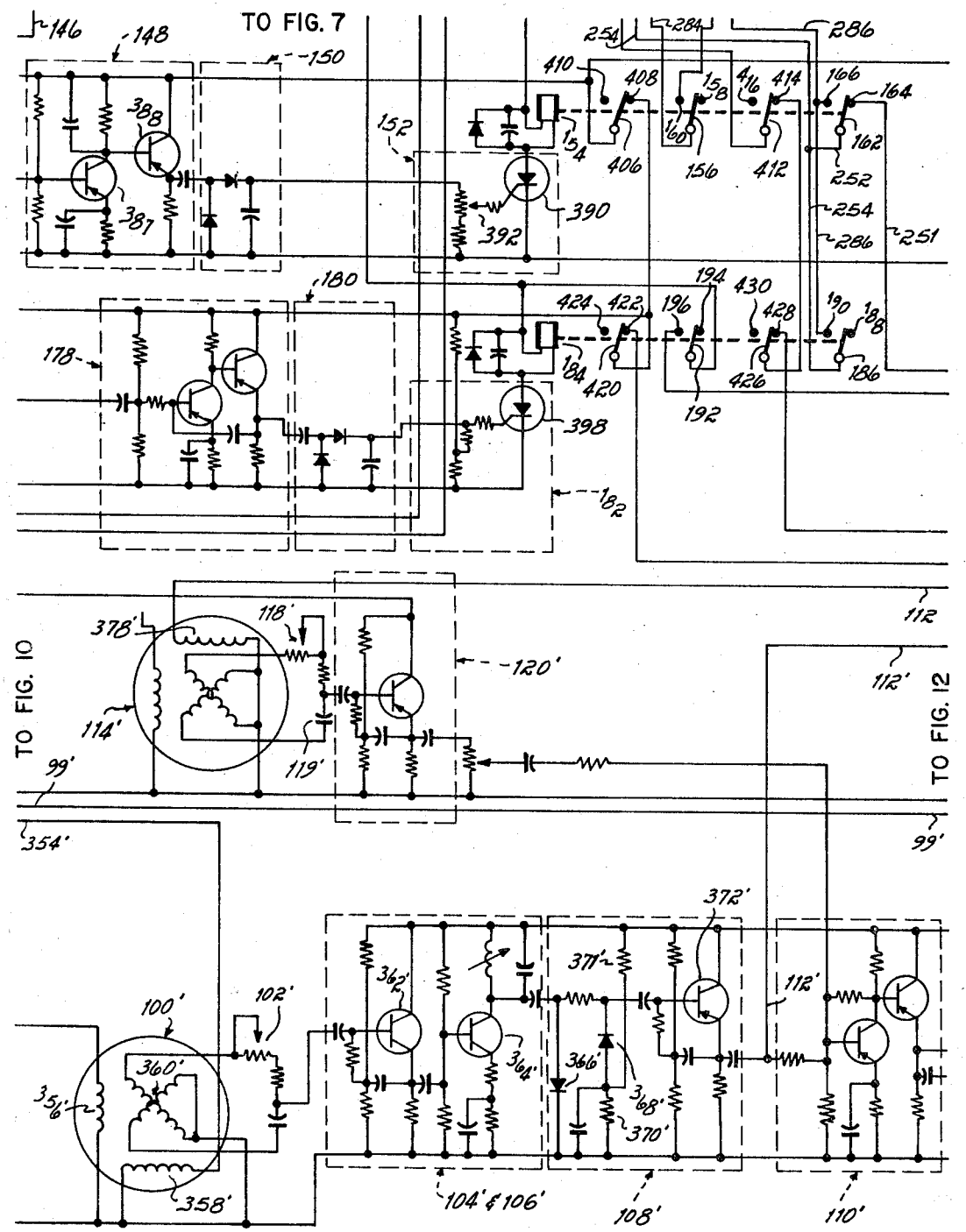
FIGURE 11 is a schematic circuit diagram of a portion of the present analyzer circuit including the two resolvers in the rear channel.
Figure 12:
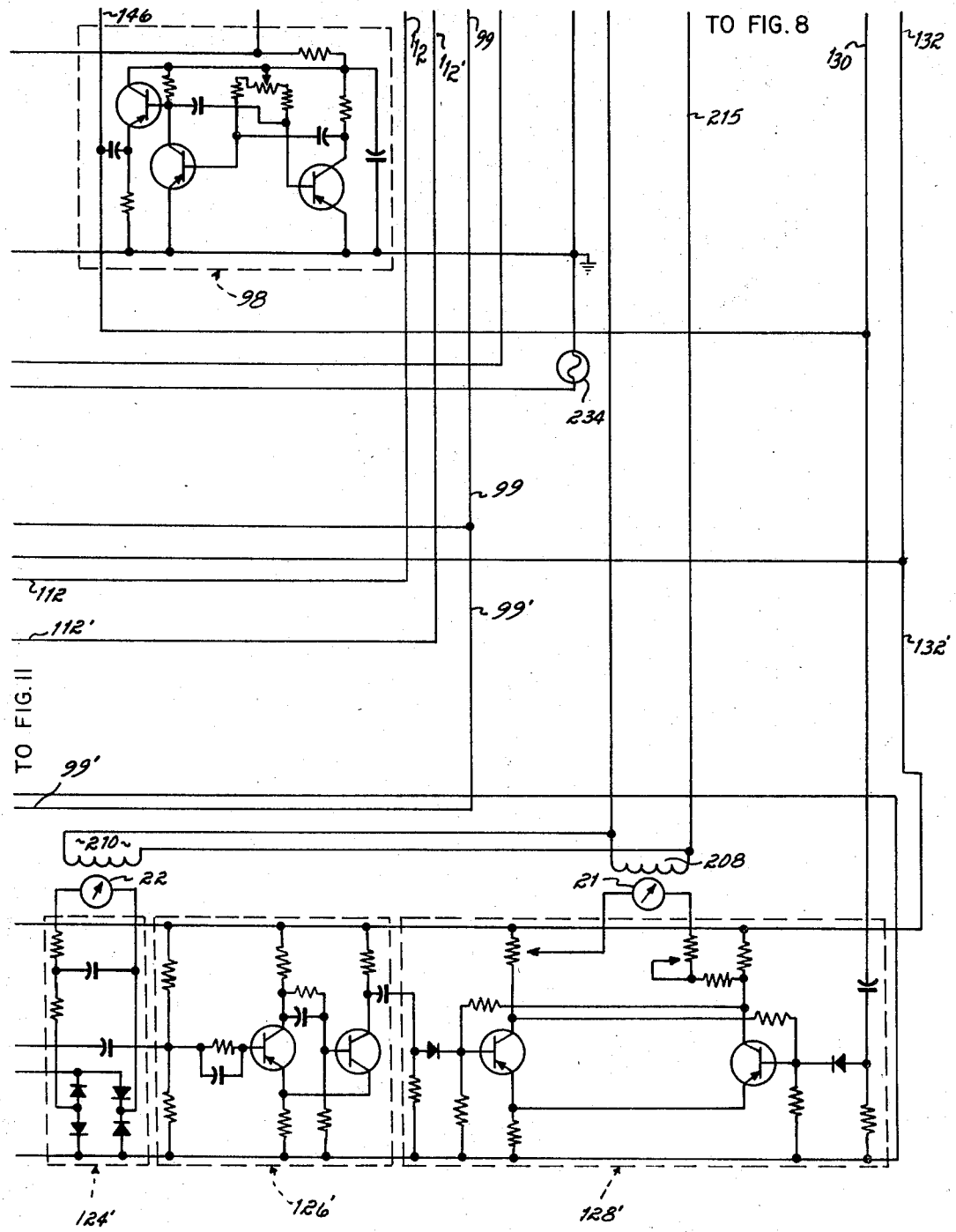
FIGURE 12 is a schematic circuit diagram of a portion of the present analyzer circuit including the circuits to the rear "amount" meter and rear "position" meter.

Circuit 152 comprises a silicon controlled rectifier (SCR) 390 having its gate electrode connected to an adjustable tap on a potentiometer 392, called the range span control. The solenoid 154 is connected in series with SCR 390. When the engine is running within the predetermined speed range, SCR 390 is non-conducting and solenoid 154 is deenergized so that its contacts are positioned as shown in FIGURE 11. Potentiometer 392 provides for adjustment of the operating speed range above and below the center speed selected by potentiometer 500.

Let us now look at the rough engine detecting circuit. The vibration signals sensed by pickups 15 and 16 are applied via conductors 170 and 174 respectively to the input of the audio mixer 172 (FIGURE 10) to provide a composite front and rear vibration signal which is passed through the M-derived low pass filter 176 having an upper cutoff frequency of 20 cycles. This filter blocks all signal frequencies which are higher than one-half of the engine speed in the predetermined range of 1200 to 1800 r.p.m. Engine roughness is generally a failure of one or more pistons to provide a torque pulse at the proper time, and vibrations caused thereby have a frequency equal to one-half the frequency of the engine speed. The output of filter 176 is applied to an amplifier and emitter follower circuit 178 and then to a diode voltage doubling and rectifying circuit 180. The output of the rectifier circuit is applied to the gate electrode of an SCR relay driver circuit 182 (FIGURE 11) which comprises an SCR 398. SCR 398 is normally non-conducting, but is fired when the engine roughness exceeds a predetermined permissible maximum level and causes the voltage output from the circuit 180 to reach the firing voltage of the SCR 398 and fire the SCR. When SCR 398 conducts, current flows through the solenoid 184 in series with the SCR, thereby energizing the solenoid 184. Switch contacts of solenoid 184 are illustrated in the deenergized condition of the solenoid.

Let us now look at timer circuit 202 (FIGURE 7) and its associated solenoid 200. The basic elements of circuit 202 are an SCR 400 and an R-C pumping circuit including a capacitor 401 and a resistor 402 having an adjustable voltage dividing tap 403 connected to the gate of the SCR. SCR 400 is normally non-conducting so that the series connected solenoid 200 is deenergized leaving the switch contacts in their normal positions as illustrated. When solenoids 154 and 184 are both in their normal deenergized position as shown, positive half cycles of current from the secondary winding 228 of transformer 226 flow through diode 399. This diode is grounded, however, through lead 286, switch arm 162 of solenoid 154 and lead 254. As a result, SCR 400 is prevented from firing and solenoid 200 remains deenergized.

We will assume that the engine has just been started and has not yet reached the desired speed range of 1200 to 1800 r.p.m. Consequently, the voltage output from voltage doubling rectifier 150 will be sufficiently high to fire the SCR 390 in the SCR relay driver circuit 152, thereby energizing solenoid 154 so that its four switch arms move from engagement with the fixed contacts as illustrated in FIGURE 11 to their alternate fixed contacts. We will further assume that the engine is running smoothly so that solenoid 184 remains in its deenergized position as illustrated. Switch arm 406 moves from fixed contact 408 into engagement with fixed contact 410, thereby removing from the electronic components of the front channel, rear channel and engine roughness circuits the B— potential provided by the secondary winding 227 of power supply 290.

Switch arm 156 is moved out of engagement with the fixed contact 158 into engagement with the fixed contact 160 to complete the circuit from the 110 volt AC power supply 124 via conductor 256 and 280 to the locking coils 204, 206, 208 and 210 to lock the front and rear meters against movement. Solenoid 200 is deenergized since switch arm 162 is in engagement with fixed contact 166, thereby grounding diode 399 to shunt the current away from the gate firing circuit of SCR 400 and prevent the SCR from conducting.

Furthermore, switch arm 412 is moved from fixed contact 414 to fixed contact 416 to interrupt the circuit between the 1 kc. reference oscillator 98 and the chopper circuits 94 and 94'. This interruption of the chopper circuits further assures that the two pickup channels will be disabled when the engine is not running within the prescribed speed range.

When the engine reaches the proper speed, the voltage output from circuit 150 is no longer sufficiently high to maintain SCR 390 conducting and solenoid 154 is deenergized. Switch arm 406, 156, 412 and 162 then engage respectively contacts 408, 158, 414 and 164 as illustrated in FIGURE 11. Switch arm 406 restores B— potential to the front and rear pickup channels and to the engine roughness channel. Switch arm 156 interrupts the circuit between the 110 volt power source 224 and the meter locking coil circuits so that the locking coil circuits are deenergized and the meter needles are free to move to their proper indicating positions. Switch arm 412 engages fixed contact 414 to complet the circuit between the 1 kc. reference oscillator 98 and the two choppers 94 and 94'.

When switch arm 162 moves out of engagement with fixed contact 166, it opens the circuit between ground and the conductor 286 which is connected to the timer and SCR relay driver circuit 202. With conductor 286 open circuited, the 6.3 volts AC from secondary 228 of transformer 226 is supplied to circuit 202 through rectifiers 397 and 399. Capacitors 401 and 404 together with rectifiers 397 and 399 form a pumping circuit which each half cycle gradually raises the potential applied to line 286, and hence to the base of SCR 400 through potentiometer 403. When the voltage applied to the base of the gate reaches the firing potential SCR 400 fires. This time is adjusted by the setting of potentiometer 403. When SCR 400 fires, this energizes solenoid 200. When solenoid 200 pulls in, the meter locks are reenergized through switch arm 214 and contact 220 and the meters are again held in their locked position. When the engine speed again drops below the 1200 r.p.m. minimum speed, solenoid 154 is reenergized. This again applies a 110 volt potential to the meter lock windings through contact 156. At the same time, solenoid 200 is deenergized since lead 286 is grounded out by contact arm 162 when solenoid 154 is pulled in. Alternatively, line 286 can be grounded by the closing of a contact 186 when solenoid 184 is pulled in.

Solenoid 184 in the rough engine detection circuit functions similarly to solenoid 154 in the speed control circuit. Let us assume the engine is running in the proper speed range. When the engine roughness exceeds the maximum permissible level, the voltage output from circuit 180 is sufficiently high to fire SCR 398 and energize solenoid 184. Consequently, switch arm 420 moves from contact 422 to contact 424 to open the circuit between the B— potential supplied by secondary 227 of transformer 226 and the electronic components of the front and rear pickup channels. Furthermore, switch arm 192 moves from fixed contact 194 into engagement with fixed contact 196 to energize the rough engine lamp 234. Switch arm 426 corresponds to switch arm 412 and moves from fixed contact 428 to fixed contact 430 to interrupt the circuit between the 1 kc. reference oscillator 98 and the choppers 94 and 94' in the front and rear pickup channels respectively. Switch arm 186 corresponds to switch arm 162 and moves from fixed contact 188 to fixed contact 190 to ground the R-C circuit 401, 402 of circuit 202 via conductors 286, 284 and 254. Consequently, SCR 400 is cut off to deenergize solenoid 200.

When the engine roughness decreases to an acceptable level, SCR 398 is cut off to deenergize solenoid 184 and return its switch arms 420, 192, 426 and 186 to the fixed contacts as illustrated in FIGURE 11. Consequently, the R-C pumping circuit 401, 402 of SCR 400 begins to charge in a five to ten second time interval. At the end of the time interval, SCR 400 fires to energize solenoid 200 and return its switch contacts to the lock position, thereby reenergizing the meter locks to hold the meter readings. During the interval when the meters were unlocked, prior to the reenergization of solenoid 200, B— was applied to the circuit components of the rear and front channels and the output of oscillator 98 was connected to choppers 94 and 94'. Furthermore, the unlock lamp 230 was illuminated and the rough engine lamp was deenergized. Consequently, the front and rear amount and position meters functioned as explained above.

There has been described in detail a preferred embodiment of an improved engine unbalance analyzer apparatus which is insensitive to variations in the speed of an engine undergoing analysis. An electrical speed signal is derived from a spark plug of the engine, electronically shaped and amplified, and used to drive two synchronous detectors in each of the front and rear pickup channels. The detectors switch at a rate corresponding to the actual speed of the engine and operate 90° out of phase with each other. Consequently, the outputs of the detectors are two DC signals which represent two 90° vector components of the unbalanced signal at the actual speed of the engine. These signals are chopped at the rate of 1000 c.p.s. and are vectorially combined in a resolver whose output is an AC signal whose amplitude and phase correspond to the amount and position, respectively, of the locus of unbalance. Prior analyzers required that the engine speed be precisely maintained at a predetermined speed.

While there have been shown and described and pointed out the fundamental novel features of the invention as applied to the preferred embodiment, it will be understood that various omissions and substitutions and changes in the form and details of the system illustrated and in its operation may be made by those skilled in the art without departing from the spirit of the invention. It is the intention, therefore, to be limited only as indicated by the scope of the following claims.

Having described my invention, I claim:

1. Unbalance analyzing apparatus for detecting the position and amount of unbalance of the rotor of a variable speed device comprising:
   (a) first transducer means associated with said device to produce an electric speed signal indicative of the speed of the rotor,
   (b) second transducer means responsive to vibrations of the device to produce an electric vibration signal indicative of the vibrations,
   (c) a pair of synchronous detectors coupled to said second transducer means,
   (d) phase shifting means coupled to said first transducer means for deriving from said speed signal two component speed signals which have a relative phase difference of 90°,
   (e) means for applying one of the component speed signals to one of the synchronous detectors and the other component speed signal to the other synchronous detector, whereby the outputs from said synchronous detectors are DC signals representing the vector components of the rotor unbalance signal,
   (f) circuit means coupled to said synchronous detector for vectorially combining said DC signals to produce a resultant unbalance AC signal whose amplitude corresponds to the amount of rotor unbalance and whose phase relative to the speed signals corresponds to the position of the rotor unbalance, and
   (g) means for detecting the amplitude and phase of the unbalanced signal to provide an indication of the amount and position of the rotor unbalance.

2. Unbalance analyzing apparatus for detecting the position and amount of unbalance of the rotor of a variable speed device comprising:
   (a) first transducer means associated with a device to produce an electric speed signal indicative of the speed of the rotor,
   (b) second transducer means responsive to vibrations of the device to produce an electric vibration signal indicative of the vibrations,
   (c) a pair of synchronous detectors coupled to said second transducer means,
   (d) phase shifting means coupled to said first transducer means for deriving from said speed signal two component speed signals which have a relative phase difference of 90°,
   (e) means for applying one of the component speed signals to one of the synchronous detectors and the other component speed signal to the other synchronous detector, whereby the outputs from said synchronous detectors are DC signals representing the vector components of the rotor unbalance signal,
   (f) circuit means coupled to said synchronous detector for vectorially combining said DC signals to produce a resultant unbalance AC signal whose amplitude corresponds to the amount of rotor unbalance and whose phase relative to the speed signals corresponds to the position of the rotor unbalance,
   (g) means coupled between said synchronous detectors and said circuit means for chopping at a relatively high frequency the DC signals representing the vector components of the rotor unbalance signal, and
   (h) means for detecting the amplitude and phase of the unbalance signal to provide an indication of the amount and position of the rotor unbalance.

3. Unbalance analyzing apparatus for detecting the position and amount of unbalance of the rotor of a variable speed device comprising:
   (a) first transducer means associated with a device to produce an electric speed signal indicative of the speed of the rotor,
   (b) second transducer means responsive to vibrations of the device to produce an electric vibration signal indicative of the vibrations,
   (c) a pair of synchronous detectors coupled to said second transducer means,
   (d) phase shifting means coupled to said first transducer means for deriving from said speed signal two component speed signals which have a relative phase difference of 90°,
   (e) means for applying one of the component speed signals to one of the synchronous detectors and the other component speed signal to the other synchronous detector, whereby the outputs from said synchronous detectors are DC signals representing the vector components of the rotor unbalance signal,
   (f) circuit means including an induction resolver connected to said synchronous detectors for vectorially combining said DC signals to produce a resultatant unbalance AC signal whose amplitude corresponds to the amount of rotor unbalance and whose phase relative to the speed signals corresponds to the position of the rotor unbalance,
   (g) means coupled between said synchronous detectors and said circuit means for chopping at a relatively high frequency the DC signals representing the vector components of the rotor unbalance signal, and
   (h) means for detecting the amplitude and phase of the unbalance signal to provide an indication of the amount and position of the rotor unbalance.

4. Engine unbalance analyzing apparatus for detecting the position and amount of unbalance of the rotor of a variable speed device comprising:
   (a) first transducer means associated with a device to produce an electric speed signal indicative of the speed of the rotor,
   (b) second transducer means responsive to vibrations of the device to produce an electric vibration signal indicative of the vibrations,
   (c) variable frequency, sharp cutoff filter means coupled to said first and second transducer means and responsive to the speed signal to pass only vibration signals having a frequency equal to the speed of the rotor,
   (d) circuit means coupled to the output of said filter means to produce a rotor unbalance signal having an amplitude corresponding to the amount of rotor unbalance and a phase corresponding to the position of rotor unbalance,
   (e) means for detecting the amplitude and phase of the unbalance signal to provide an indication of the amount and position of the rotor unbalance, and
   (f) speed sensing means connected to said first transducer means and responsive to said speed signal, said speed sensing means including circuit interrupting means in circuit connection with said amplitude and phase detecting means, said circuit interrupting means being effective to render said amplitude and phase detecting means inoperative when the rotor is outside of a predetermined speed range.

5. Engine unbalance analyzing apparatus for detecting the position and amount of unbalance of the rotor of a variable speed engine comprising:
(a) first transducer means associated with a running engine to produce an electric speed signal indicative of the speed of the rotor,
(b) second transducer means responsive to vibrations of the engine to produce an electric vibration signal indicative of the vibrations,
(c) variable frequency, sharp cutoff filter means coupled to said first and second transducer means and responsive to the speed signal to pass only vibration signals having a frequency equal to the speed of the rotor,
(d) circuit means coupled to the output of said filter means to produce a rotor unbalance signal having an amplitude corresponding to the amount of rotor unbalance and a phase corresponding to the position of rotor unbalance,
(e) means for detecting the amplitude and phase of the unbalance signal to provide an indication of the amount and position of the rotor unbalance, and
(f) engine roughness detection means connected to said first transducer means and responsive to vibration signal component frequencies one-half the speed of the rotor, said engine roughness detection means including circuit interrupting means in circuit connection with said amplitude and phase detecting means, said circuit interrupting means being effective to render inoperative said amplitude and phase detecting means when said last named vibration signal components exceed a predetermined level.

6. Engine unbalance analyzing apparatus for detecting the position and amount of unbalance of the rotor of a variable speed device comprising:
(a) first transducer means associated with a device to produce an electric speed signal indicative of the speed of the rotor,
(b) second transducer means responsive to vibrations of the device to produce an electric vibration signal indicative of the vibrations,
(c) a pair of synchronous detectors coupled to said second transducer means,
(d) phase shifting means coupled to said first transducer means for deriving from said speed signal two component speed signals which have a relative phase difference of 90°,
(e) means for applying one of the component speed signals to gate one of the synchronous detectors and the other component speed signal to gate the other synchronous detector,
(f) circuit means including an induction resolver and a 90° phase shift network coupled to the output of said synchronous detectors to produce a rotor unbalance signal having an amplitude corresponding to the amount of rotor unbalance and a phase corresponding to the position of rotor unbalance, and
(g) means for detecting the amplitude and phase of the unbalance signal to provide an indication of the amount and position of the rotor unbalance.

7. In an unbalance analyzing apparatus for detecting the position and unbalance of a rotor forming part of an assembly, the combination of:
(a) first transducer means associated with said apparatus to produce an electric speed signal indicative of the speed of the rotor,
(b) second transducer means responsive to vibrations of the apparatus to produce an electric vibration signal indicative of the vibrations,
(c) two synchronous detectors connected to said second transducer,
(d) square wave shaping circuit and phase shifting means connected to said first transducer and to said synchronous detectors for gating said synchronous detectors at rotor speed and at a 90° phase difference, whereby the output signal of said synchronous detectors is correlated only with vibrations due to rotor unbalance, and
(e) means including an induction resolver connected to said synchronous detectors for vectorially combining the output signals thereof to form a single signal having a phase angle correlated with the angular position of rotor unbalance, and an amplitude correlated with the amount of rotor unbalance.

References Cited

UNITED STATES PATENTS

| | | | |
|---|---|---|---|
| 2,381,645 | 8/1945 | Carlstein | 73—465 |
| 2,405,430 | 8/1946 | Kent | 73—462 |
| 2,983,148 | 5/1961 | White | 73—465 |
| 2,985,833 | 5/1961 | Trimble | 73—462 XR |
| 2,986,920 | 6/1961 | Fibikar | 73—462 XR |
| 3,023,613 | 3/1962 | Crawford | 73—466 XR |
| 3,030,813 | 4/1962 | Crawford et al. | 73—466 |
| 3,056,300 | 10/1962 | Lash et al. | 73—462 |
| 3,144,774 | 8/1964 | Bjorn | 73—466 |
| 3,184,976 | 5/1965 | Greiner | 73—462 |
| 3,211,008 | 10/1965 | Ongaro et al. | 73—462 |
| 3,331,252 | 7/1967 | Thomas et al. | 73—462 |

FOREIGN PATENTS

| | | |
|---|---|---|
| 729,901 | 5/1955 | Great Britain. |
| 760,678 | 11/1956 | Great Britain. |
| 860,847 | 2/1961 | Great Britain. |

JAMES J. GILL, *Primary Examiner.*